(12) United States Patent
Okuda

(10) Patent No.: US 9,198,081 B2
(45) Date of Patent: Nov. 24, 2015

(54) COMMUNICATION SYSTEM, RECEIVING DEVICE, RELAY DEVICE, RECEPTION METHOD, AND RELAY METHOD

(75) Inventor: Masato Okuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 249 days.

(21) Appl. No.: 13/332,806

(22) Filed: Dec. 21, 2011

(65) Prior Publication Data

US 2012/0195309 A1 Aug. 2, 2012

(30) Foreign Application Priority Data

Jan. 27, 2011 (JP) ................. 2011-014922

(51) Int. Cl.
*H04W 28/06* (2009.01)
*H04L 1/18* (2006.01)
*H04L 1/16* (2006.01)
*H04L 1/00* (2006.01)
*H04W 84/04* (2009.01)

(52) U.S. Cl.
CPC ............. *H04W 28/06* (2013.01); *H04L 1/1835* (2013.01); *H04L 1/1614* (2013.01); *H04L 2001/0097* (2013.01); *H04W 84/047* (2013.01)

(58) Field of Classification Search
CPC ... H04L 2012/56; H04L 12/56; H04W 84/18; H04W 88/08; H04W 88/06; H04W 84/12; H04W 80/04; H94W 80/04
See application file for complete search history.

(56) References Cited

U.S. PATENT DOCUMENTS

| | | | | |
|---|---|---|---|---|
| 4,885,739 A | * | 12/1989 | Read et al. | 370/384 |
| 6,246,679 B1 | * | 6/2001 | Yamamoto | 370/352 |
| 7,436,831 B2 | * | 10/2008 | Miller et al. | 370/389 |
| 8,014,819 B2 | * | 9/2011 | Manousakis et al. | 455/552.1 |
| 2003/0091121 A1 | * | 5/2003 | Kenmochi | 375/272 |
| 2005/0232285 A1 | * | 10/2005 | Terrell et al. | 370/401 |
| 2005/0262241 A1 | * | 11/2005 | Gubbi et al. | 709/225 |
| 2005/0286458 A1 | * | 12/2005 | Furukawa et al. | 370/315 |
| 2006/0058017 A1 | * | 3/2006 | Ng et al. | 455/419 |
| 2006/0223541 A1 | * | 10/2006 | Famolari | 455/450 |
| 2008/0279181 A1 | * | 11/2008 | Shake et al. | 370/389 |
| 2009/0217064 A1 | * | 8/2009 | Terasawa | 713/310 |
| 2009/0258647 A1 | * | 10/2009 | Yamada et al. | 455/435.1 |
| 2011/0158147 A1 | * | 6/2011 | Li et al. | 370/312 |
| 2011/0296275 A1 | * | 12/2011 | Kishigami et al. | 714/755 |

FOREIGN PATENT DOCUMENTS

| | | |
|---|---|---|
| JP | 2003-078580 | 3/2003 |
| JP | 2007-209040 | 8/2007 |
| JP | 2007-266876 | 10/2007 |

(Continued)

OTHER PUBLICATIONS

Notification of Reasons for Refusal dated Feb. 18, 2014 from the corresponding Japanese Application No. 2011-014922.

*Primary Examiner* — Hassan Phillips
*Assistant Examiner* — Prenell Jones
(74) *Attorney, Agent, or Firm* — Katten Muchin Rosenman LLP

(57) ABSTRACT

A receiving device includes a packet receiver that is coupled to a plurality of paths, and a packet transmitter that generates reception-acknowledgement information indicating that the packet receiver receives a packet when the packet receiver receives the packet over one of the paths, and that transmits the reception-acknowledgement information to a path that is among the plurality of paths and different from the path over which the packet receiver has received the packet.

11 Claims, 23 Drawing Sheets

(56) References Cited

FOREIGN PATENT DOCUMENTS

| JP | 4074268 | 2/2008 |
|---|---|---|
| JP | 4074304 | 2/2008 |
| JP | 2008-109262 | 5/2008 |
| JP | 2009-147579 | 7/2009 |
| JP | 2009-278557 | 11/2009 |
| JP | 2012-500553 | 1/2012 |
| WO | 2010/021498 | 2/2010 |

* cited by examiner

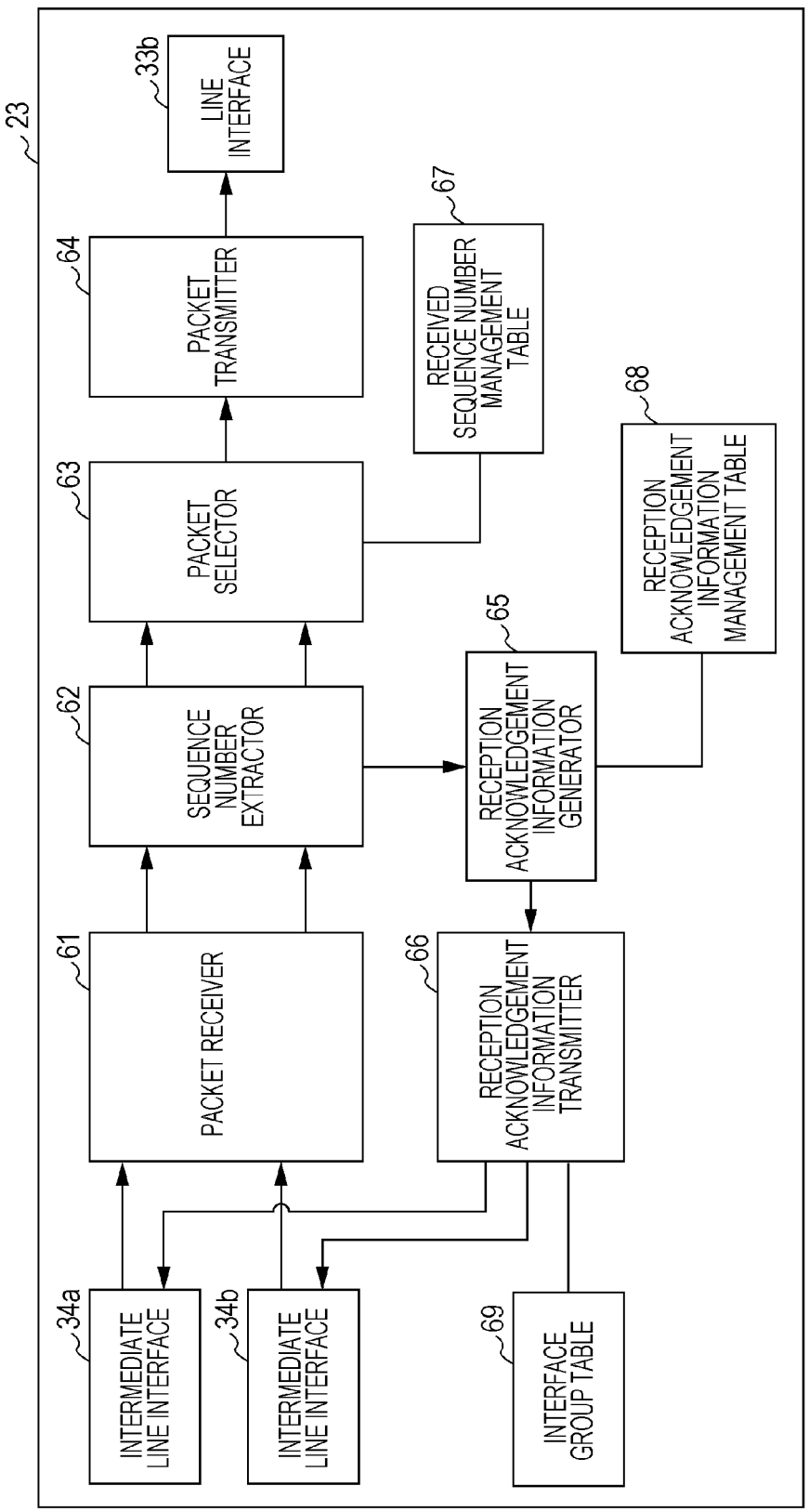

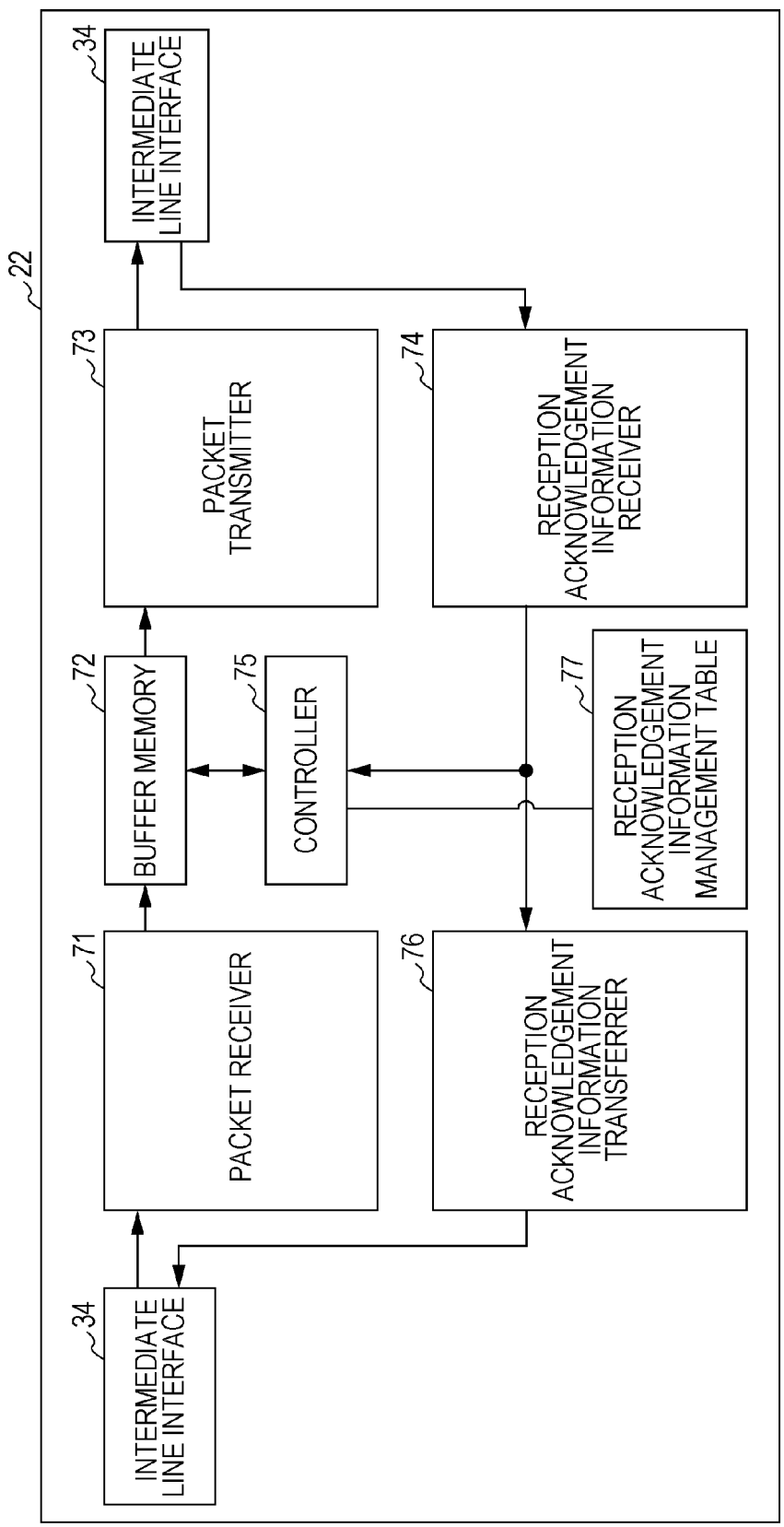

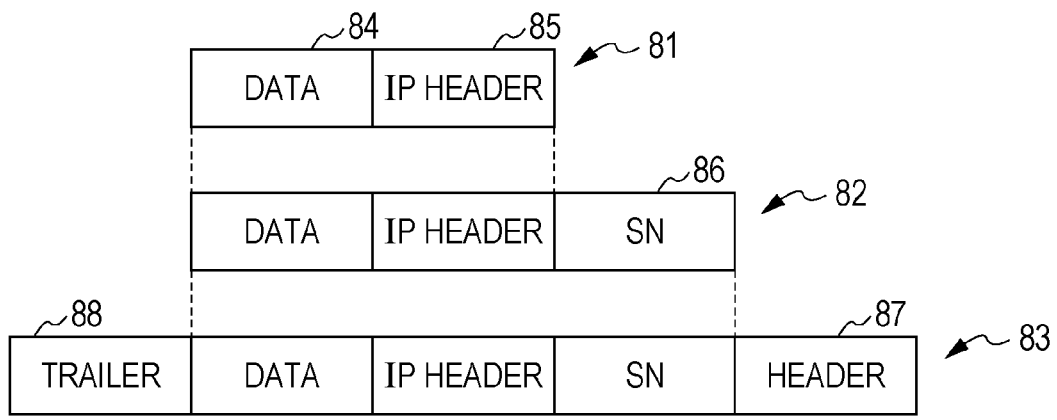

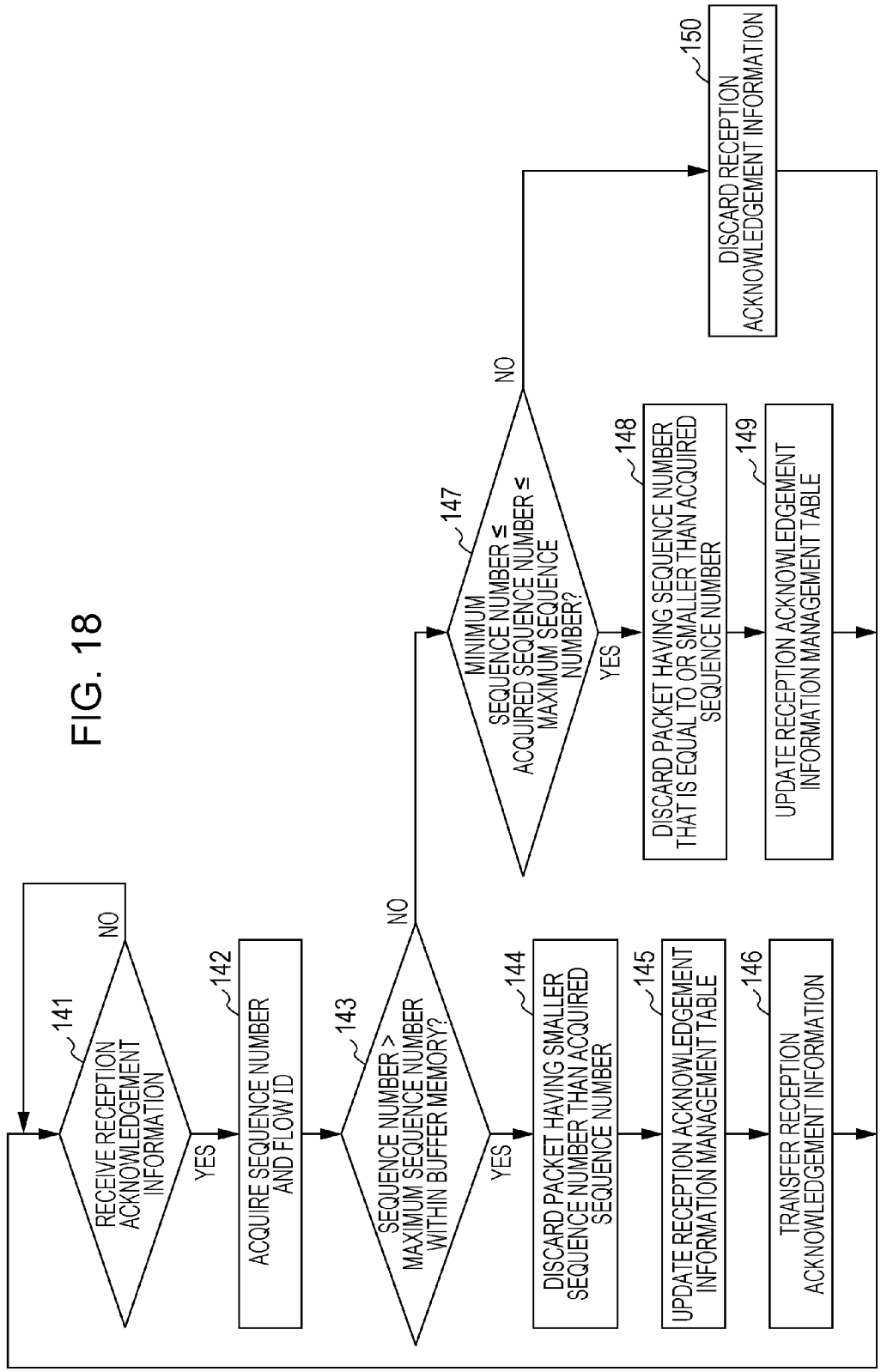

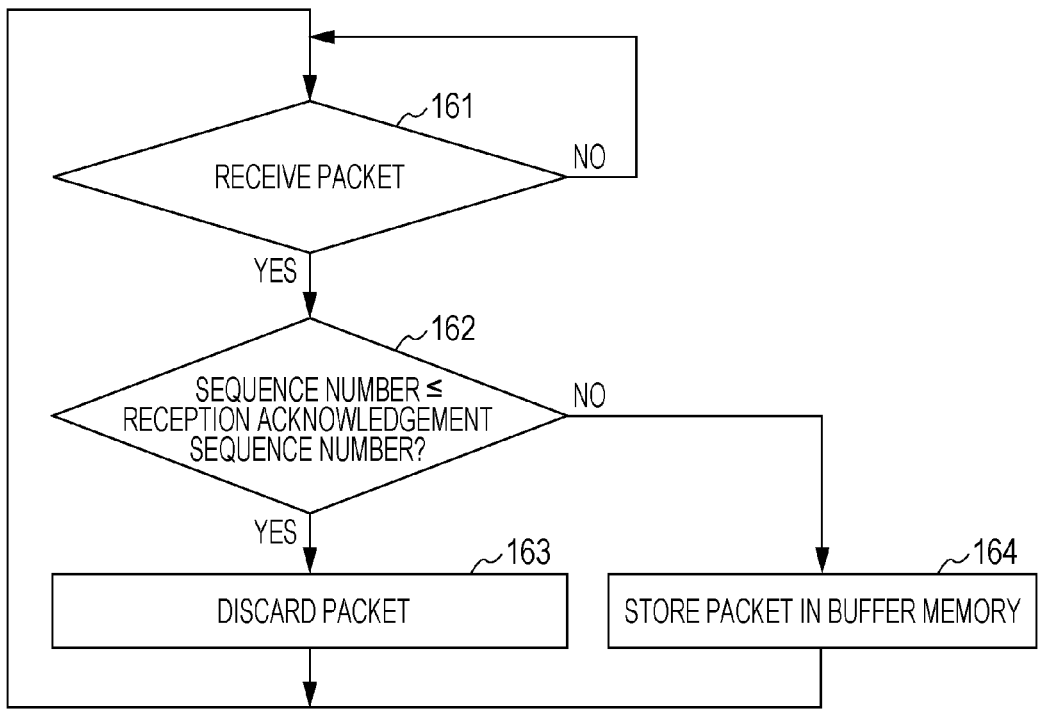

COMMUNICATION SYSTEM, RECEIVING DEVICE, RELAY DEVICE, RECEPTION METHOD, AND RELAY METHOD

CROSS-REFERENCE TO RELATED APPLICATION

This application is based upon and claims the benefit of priority of the prior Japanese Patent Application No. 2011-014922, filed on Jan. 27, 2011, the entire contents of which are incorporated herein by reference.

FIELD

The embodiments discussed herein are related to a packet communication system.

BACKGROUND

In recent years, there has been an increase in the number of cases in which a wireless technique is applied to a backhaul or the like that connects a base station of a mobile phone network to a core network so that an entire network is quickly built at low cost. In general, however, a wireless network has specific problems. Specifically, the wireless network has lower reliability than a wired network and a link rate of the wireless network is not constant.

For example, the rate of a wireless link may be dynamically changed by changing a modulation scheme and/or a coding rate based on a change in a wireless environment in order to maintain a bit error rate at a level that is equal to or lower than a certain value. Especially, for example, when the wireless environment becomes worse owing to a change in the weather or the like, the modulation scheme and/or the coding rate are changed to a lower-rate modulation scheme and/or a lower coding rate. Thus, the efficiency of transmission may be reduced and the rate of the wireless link may be significantly reduced. When the link rate is reduced, a packet is easily delayed or lost owing to overflow of a buffer with packets that are not transmitted.

As described above, a failure easily occurs in a wireless network, compared with a wired network. Thus, a technique for improving the reliability of the wireless network is necessary.

As a related technique for improving the reliability of a network, a redundancy is known.

Normally, an operator guarantees a very high utilization of, for example, 99.99% in a service level agreement (SLA) for a network system in some cases. However, a utilization that is calculated from a failure rate of a network device is lower than a utilization to be guaranteed in many cases. In addition, in a trunk over which data from multiple users is multiplexed, when a failure occurs in a single part of a network system, communication of a lot of users is affected by the failure. It is necessary to improve the reliability of a network by using a redundancy technique and thereby ensuring a detour path that is used when a failure occurs in a device.

For example, as illustrated in FIG. 1, the following technique has been proposed. In the technique, packet transfer devices that are a transmitting device and a receiving device each transfer a packet. The transmitting device copies a packet so as to generate a plurality of packets that are the same as the original packet. Then, the transmitting device transmits the generated packets over a plurality of communication paths to the receiving device. The receiving device selects a single packet from among the packets.

When the aforementioned redundancy technique is used, and a packet that propagates in one of the communication paths is lost, the receiving device may receive the same packet over the other communication path. In addition, when a packet that propagates in one of the communication paths is delayed, the receiving device may receive the same packet over the other communication path without a delay. Thus, the reliability of the network is improved.

Packet transfer devices that use redundant communication paths are disclosed in Japanese Laid-open Patent Publications Nos. 2007-209040 and 2009-147579 and Japanese Patents Nos. 4074268 and 4074304. In retransmission control that is performed in order to reliably transmit and receive a packet, a device that has received the packet transmits an ACK (acknowledgement response) to a device that has transmitted the packet in general. Specifically, when the receiving device receives the packet, the receiving device generates the ACK that includes information (a sequence number and the like) specifying the packet, and the receiving device transmits the ACK to the device that has transmitted the packet.

Thus, the transmitting device may confirm whether or not the receiving device has received the packet transmitted by the transmitting device. When the ACK is not received by the transmitting device, the transmitting device determines that the packet is not received by the receiving device, and the transmitting device retransmits the packet. Thus, the packet is reliably transmitted and received between the transmitting device and the receiving device.

However, when a wireless network is redundant in a simple manner, the following problem remains.

It is assumed that a wireless environment of one of redundant paths provided in a redundant wireless network becomes worse. Specifically, it is assumed that relay devices are sufficiently separated from each other and the wireless environment of only the one of the redundant paths becomes worse owing to the weather or the like, as illustrated in FIG. 2. Based on this assumption, the rate of only one of wireless links is easily reduced, and a packet is easily delayed or lost in the one of the wireless links.

Thus, a packet that is the same as a packet that has been already received by a receiving device over the other wireless link may be significantly delayed and received from a node located on the path whose wireless environment is worse. Therefore, transmission of the packet that is the same as the packet already received by the receiving device leads to waste of a wireless resource and is not preferable.

The aforementioned problem is described below in detail with reference to FIG. 2. As illustrated in FIG. 2, the relay devices are sufficiently separated from each other, and the quality of a wireless link that connects the transmitting device to the receiving device is reduced in one of the communication paths owing to a bad weather in some cases, or the link rate is reduced in some cases. When the link rate is reduced, a delay of transfer of a packet or a delay of buffering a packet increases in the communication path in which the quality of the wireless link is reduced.

Thus, a relay device that is located on the communication path in which the quality of the wireless link is reduced may delay transfer of a packet and transfer the packet that does not need to be transferred since the same packet has been received by the receiving device over the other communication path. The transfer of the packet is waste of the wireless resource.

In addition, a packet remains in a buffer until the packet is transferred. Thus, in the relay device, the buffer overflows since a packet that does not need to be transferred or is the same as the packet received from the other path by the receiving device remains in the buffer. This may cause a loss of the packet.

The same problem occurs not only when the link rate is reduced, but also when one of the plurality of paths that connect the receiving device to the transmitting device is much longer than the other path. It is highly likely that reception of a packet that is transferred over the longer path is delayed, compared with a packet that is transferred over the shorter path. Thus, a relay device that is located on the longer path may transfer a packet that is the same as a packet received by the receiving device over the other path and does not need to be transferred. The transfer of this packet leads to waste of the wireless resource.

It is considered that a packet is transferred only over a path that is one of redundant paths and whose link rate is higher than the other path in order to prevent such waste of a wireless resource. However, since the links are wireless, it is inevitable that a certain percentage of packets are lost. Thus, it is not realistic to transfer a packet only over the path whose link rate is higher than the other path. It is necessary to transfer the packet though the other path whose link rate is lower than the path.

Even when such a redundant configuration and general retransmission control are applied, and an ACK is transmitted in accordance with the general retransmission control, the transmitting device may only determine whether or not a packet that is transmitted by the transmitting device has been received. Thus, even when the ACK is transmitted in accordance with the general retransmission control, the aforementioned problem might not be solved.

SUMMARY

Accordingly, it is an object in one aspect of the embodiments to provide a receiving device includes a packet receiver that is coupled to a plurality of paths, and a packet transmitter that generates reception-acknowledgement information indicating that the packet receiver receives a packet when the packet receiver receives the packet over one of the paths, and that transmits the reception-acknowledgement information to a path that is among the plurality of paths and different from the path over which the packet receiver has received the packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a block diagram illustrating the receiving device according to the first embodiment.

FIG. 9 is a block diagram illustrating the relay device according to the first embodiment.

FIG. 10 is a diagram illustrating a format of a packet that is transferred by the relay device and received by the receiving device according to the first embodiment.

FIG. 11 is a diagram illustrating a received sequence number management table that is included in the receiving device according to the first embodiment.

FIG. 12 is a diagram illustrating a reception-acknowledgement information management table that is included in each of the receiving device and the relay device according to the first embodiment.

FIG. 18 is a diagram illustrating a method for performing a process of controlling the reception-acknowledgement information in the relay device according to the first embodiment.

FIG. 19 is a diagram illustrating a method for performing a process of controlling a packet in the relay device according to the first embodiment.

FIG. 20 is a diagram illustrating a reception-acknowledgement information management table that is included in a relay device according to a second embodiment.

DESCRIPTION OF EMBODIMENTS

Figure 1:
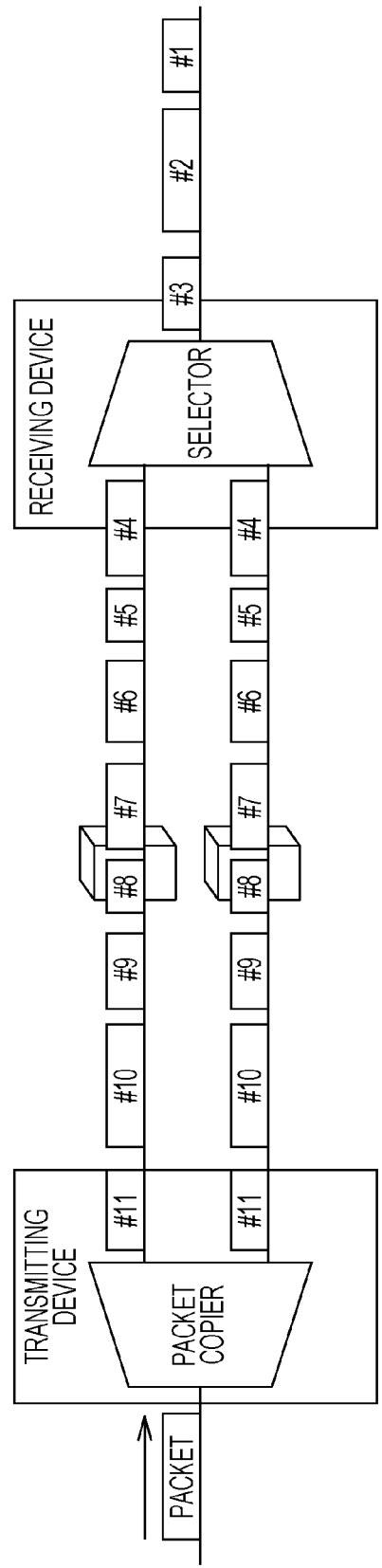
FIG. 1 is an outline diagram illustrating a related technique.
Figure 2:
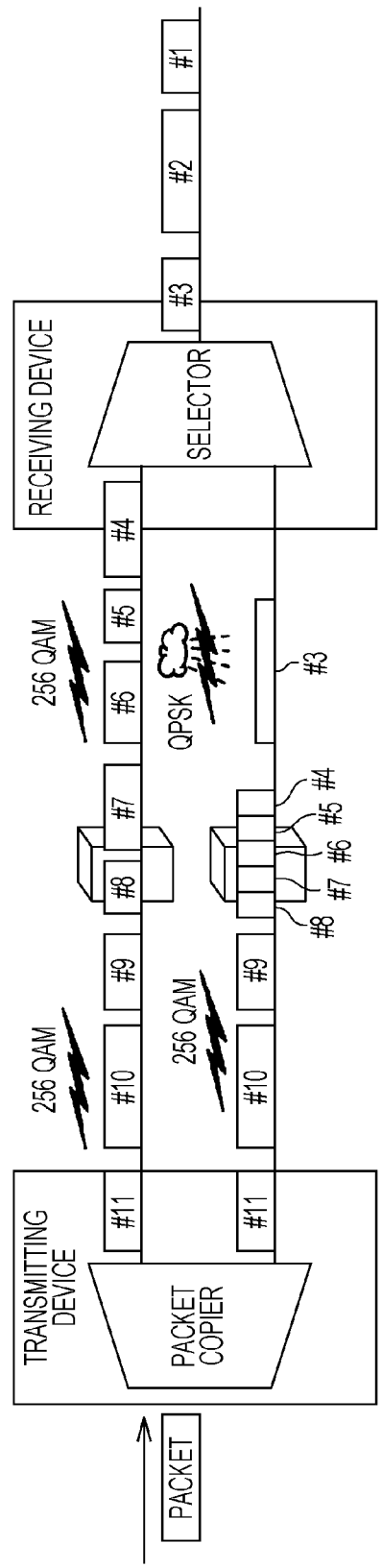
FIG. 2 is a diagram illustrating a problem with the related technique.

Embodiments of a communication system disclosed herein, a receiving device disclosed herein, a relay device disclosed herein, a reception method disclosed herein, and a relay method disclosed herein are described below with reference to the accompanying drawings. Configurations that are illustrated in the drawings to be referenced for the embodiments are examples. The invention is not limited to the configurations. In Background, the wireless system is described above as an example. However, a system to which the invention is applied is not limited to a wireless system.

A first embodiment is described with reference to FIGS. 3 to 19.

Figure 3:
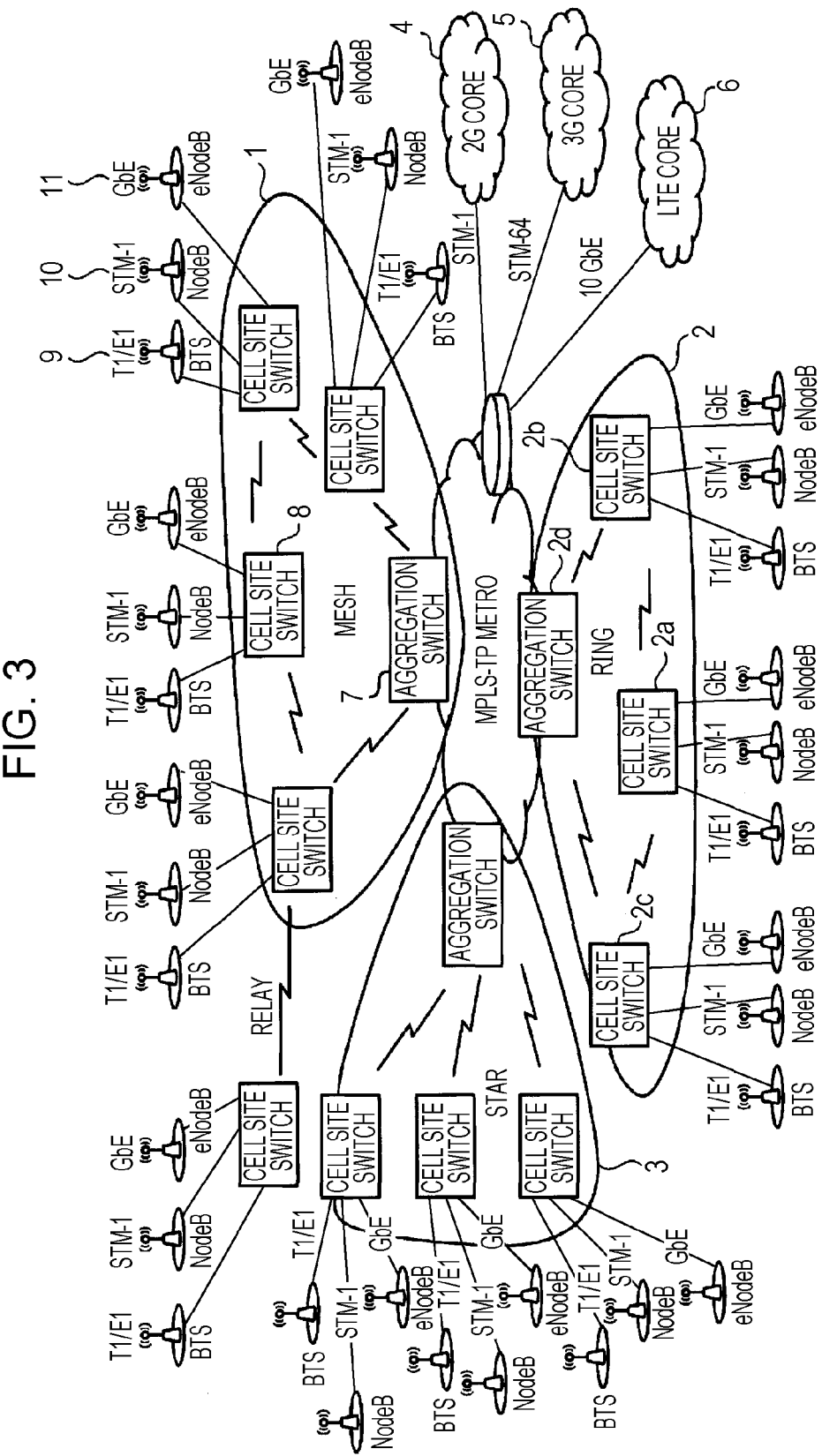
FIG. 3 is a diagram illustrating an entire network that includes a receiving device and a relay device according to a first embodiment.

FIG. 3 is a diagram illustrating an entire network that includes a receiving device and relay devices according to the first embodiment. In the single physical network, a plurality of networks logically exist. In addition, a 2G core, a 3G core and a LTE core are logical networks and described later. Networks other than the logical networks are physical networks. The configuration of the network illustrated in FIG. 3 may be achieved by a technique such as an ATM technique or a virtual local area network (VLAN) using Ethernet.

In the configuration of the network illustrated in FIG. 3, the receiving device and the relay devices according to the present embodiment may be configured in a ring topology and a mesh topology. For example, if the ring topology is used and a cell site switch 2a is a transmitting device according to the present embodiment, the relay devices are a cell site switch 2b and a cell site switch 2c and the receiving device is an aggregation switch 2d.

The transmitting device, the relay devices, and the receiving device according to the present embodiment are not limited to the aforementioned example, and may be each applied to any of all cell site switches and aggregation switches.

A mesh network 1 is a network that is configured in a mesh form and in which each of nodes is coupled to one or more nodes. A ring network 2 is a network in which nodes are coupled to each other in a ring form. A star network 3 is a network in which a single node is coupled to nodes in a radial fashion. In the star network 3, an aggregation switch or the like is centered, and individual base stations communicate with the aggregation switch, for example.

The 2G core 4 is, for example, a core network for a global system (GSM) for mobile communications and includes a mobile switching center (MSC) and a gateway MSC (GMSC). For example, the MSC provides network services such as management (registration of positions or the like) of movements, control of handover, transmission of a call, and reception of a call.

The 3G core 5 is, for example, a core network for IMT-2000 and includes a mobile switching center/visitor location register (MSC/VLR), a gateway MSC (GMSC), and a 3G serving GPRS support node/3G gateway GPRS support node (SGSN/GGSN). For example, the MSC/VLR and the GMSC are circuit switching networks, while the SGSN/GGSN is a packet switching network.

The LTE core 6 includes a serving gateway (S-GW), a PDN gateway (P-GW) and a mobility management entity (MME). For example, the S-GW transfers user data, the P-GW assigns an IP address, and the like. For example, the MME controls an S1-U interface and an eNodeB.

Aggregation switches 7 are a general term of switches arranged in the networks. Cell site switches 8 are a general term of switches arranged in base stations and have a role in logically multiplexing a plurality of networks.

The aggregation switches 7 and the cell site switches 8 are devices that multiplex TDM type traffic (over a T1/E1 link or the like) and packet type traffic (over a GbE or the like) and switch the traffic.

Base transceiver stations (BTSs) 9 are wireless base stations that corresponds to the 2G core 4. NodeBs 10 are wireless base stations that correspond to the 3G core 5. Evolved NodeBs (eNodeBs) 11 are wireless base stations that correspond to the 4G core 6. Most of functions that are included in a radio network controller (RNC) of a related technique are provided in each of the eNodeBs 11.

Figure 4:
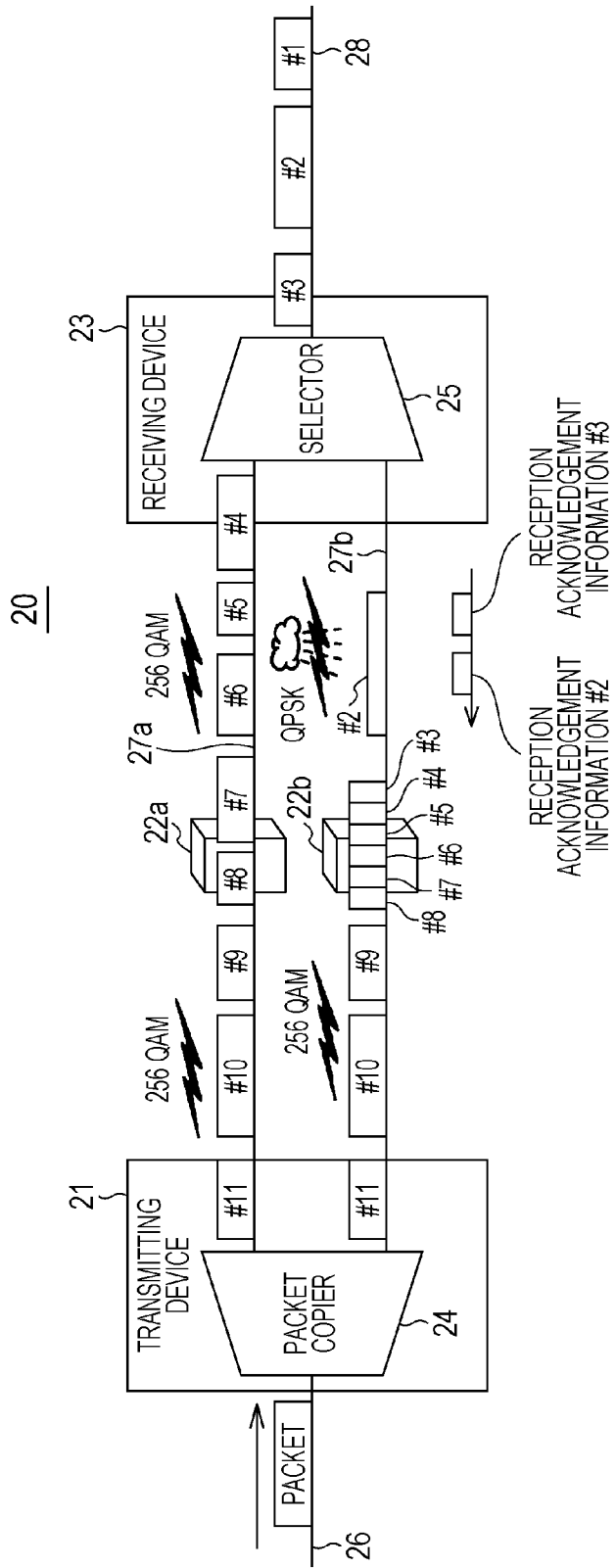
FIG. 4 is an outline diagram illustrating the receiving device and the relay device according to the first embodiment.

FIG. 4 is an outline diagram illustrating the receiving device and the relay devices according to the first embodiment.

As illustrated in FIG. 4, a packet transfer system 20 includes a transmitting device 21, relay devices 22a and 22b, a receiving device 23, communication paths 26 and 28, and intermediate communication paths 27a and 27b. The transmitting device 21 includes a packet copier 24, while the receiving device 23 includes a selector 25.

The transmitting device 21 receives a packet from the communication path 26 and uses the packet copier 24 to copy the received packet. The transmitting device 21 transmits the copied packet to each of the intermediate communication paths 27a and 27b.

The receiving device 23 receives the packet from the transmitting device 21 over at least one of the relay devices 22a and 22b. When the receiving device 23 receives the packet, the receiving device 23 transmits an ACK message (indicating that the receiving device 23 has received the packet) to at least an intermediate communication path that is among the intermediate communication paths 27a and 27b and different from the other intermediate communication path 27a or 27b from which the receiving device 23 has received the packet.

The ACK message indicates that the interested packet corresponding to the ACK message has been received by the receiving device 23 and that a packet has been received by the receiving device 23 before the reception of the interested packet. For example, as illustrated in FIG. 4, an ACK #4 is transmitted to the intermediate communication path 27b. In this case, the ACK #4 indicates that packets #1 to #3 have already been received by the receiving device 23.

When a packet that is newly received by the receiving device 23 is the same as a packet already received by the receiving device 23, the packet that is newly received by the receiving device 23 is discarded by the selector 25.

At least one of the relay devices 22a and 22b receives the ACK message from the receiving device 23 and discards the interested packet indicated by the ACK message and the packet that has been received before the reception of the interested packet and is indicated by the ACK message.

Figure 5:
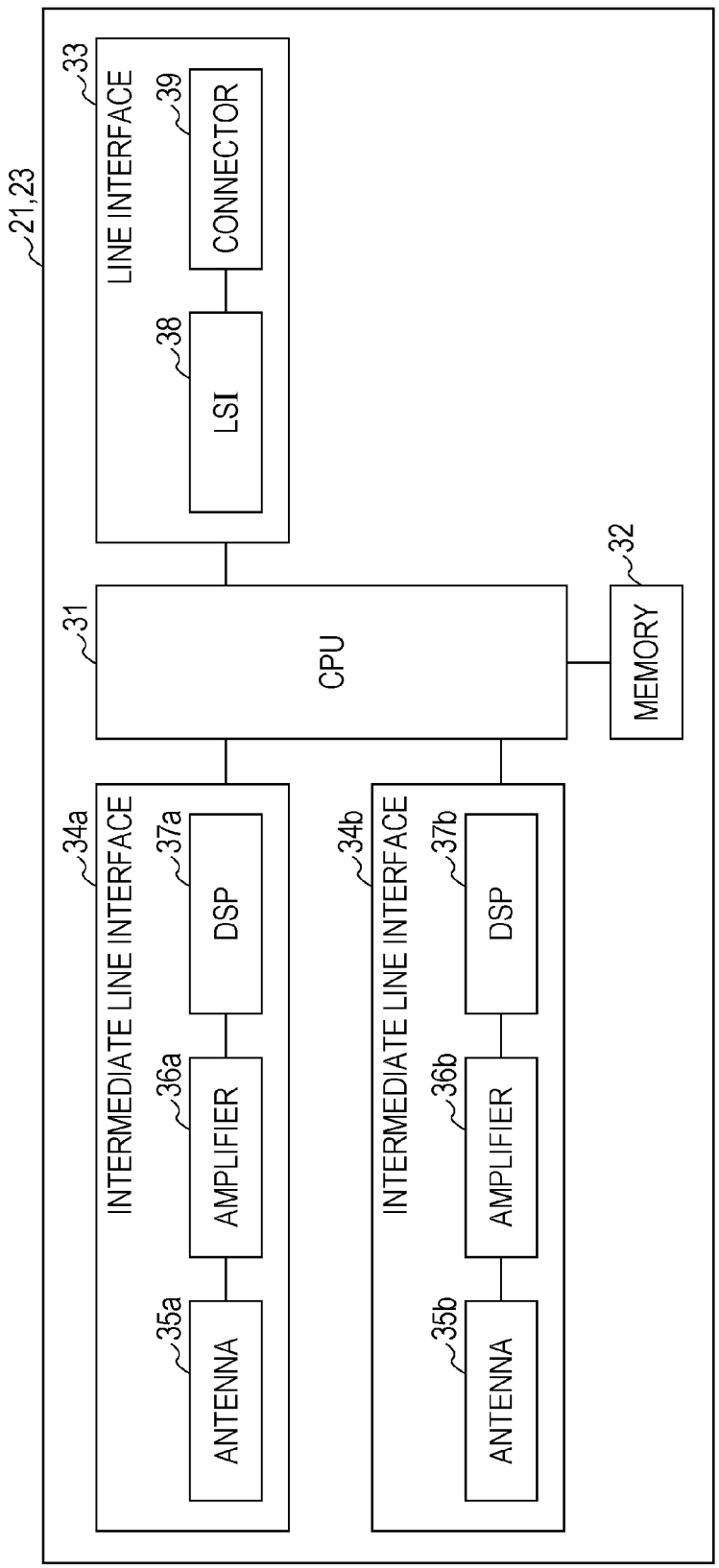
FIG. 5 is a diagram illustrating a hardware configuration of each of a transmitting device and the receiving device according to the first embodiment.

FIG. 5 is a diagram illustrating a hardware configuration of each of the transmitting device and the receiving device according to the first embodiment.

As illustrated in FIG. 5, the transmitting device 21 and the receiving device 23 each include a central processing unit (CPU) 31, a memory 32, a line interface 33 and intermediate line interfaces 34. The line interface 33 includes an LSI 38 and a connector 39. The intermediate line interfaces 34 each include a digital signal processor (DSP) 37, an amplifier 36 and an antenna 35. In this Specification, CPU may be called as a "processor" or a computer.

The CPU 31 is an example of a constituent element that controls the other constituent elements. The CPU 31 executes an operating system (OS) stored in the memory 32 and application programs stored in the memory 32, and thereby controls the constituent elements and reads and writes data from and in the memory 32. In addition, the CPU 31 achieves functions (described later) of a packet receiver 51, a sequence number adder 52, a packet copier 53 and a packet transmitter 54. The packet receiver 51, the sequence number adder 52, the packet copier 53 and the packet transmitter 54 are included in the transmitting device 21. In addition, the CPU 31 achieves functions (described later) of a packet receiver 61, a sequence number extractor 62, a packet selector 63, a packet transmitter 64, a reception-acknowledgement information generator 65 and a reception-acknowledgement information transmitter 66. The packet receiver 61, the packet selector 62, the sequence number extractor 63, the packet transmitter 64, the reception-acknowledgement information generator 65 and the reception-acknowledgement information transmitter 66 are included in the receiving device 23.

The memory 32 is made up of a storage medium. For example, the memory 32 may be made up of a read-only memory (ROM) and a random-access memory (RAM). The ROM stores the OS, the application programs to be used for various processes, and the like. However, the OS, the application programs and the like may be stored in the RAM. The RAM includes a work area in which the OS and the application programs are loaded. In addition, the RAM stores data to be used by the receiving device 23. The memory 32 includes a received sequence number management table 67 (described later), a reception-acknowledgement information management table 68 (described later), and an interface group table 69 (described later).

The LSI 38 is an electronic circuit formed by mounting a lot of transistors, diodes and the like on a semiconductor chip. The connector 39 of the transmitting device 21 is used to connect the transmitting device 21 to a wired line. The connector 39 of the receiving device 23 is used to connect the receiving device 23 to a wired line.

The DSP 37 is a processor that specializes in performing digital signal processing. For example, the DSP 37 modulates and demodulates a signal. The amplifier 36 is an electronic circuit (voltage amplifying electronic circuit, current amplifying electronic circuit, or voltage amplifying electronic circuit) that amplifies a voltage, a current or power of an input signal and outputs the signal.

The antenna 35 uses a radio wave as a medium to transmit the signal output from the amplifier 36, for example. In addition, the antenna 35 receives a signal transmitted using a radio wave as a medium by the transmitting device 21 or the receiving device 23 and outputs the received signal to the amplifier 36.

Figure 6:
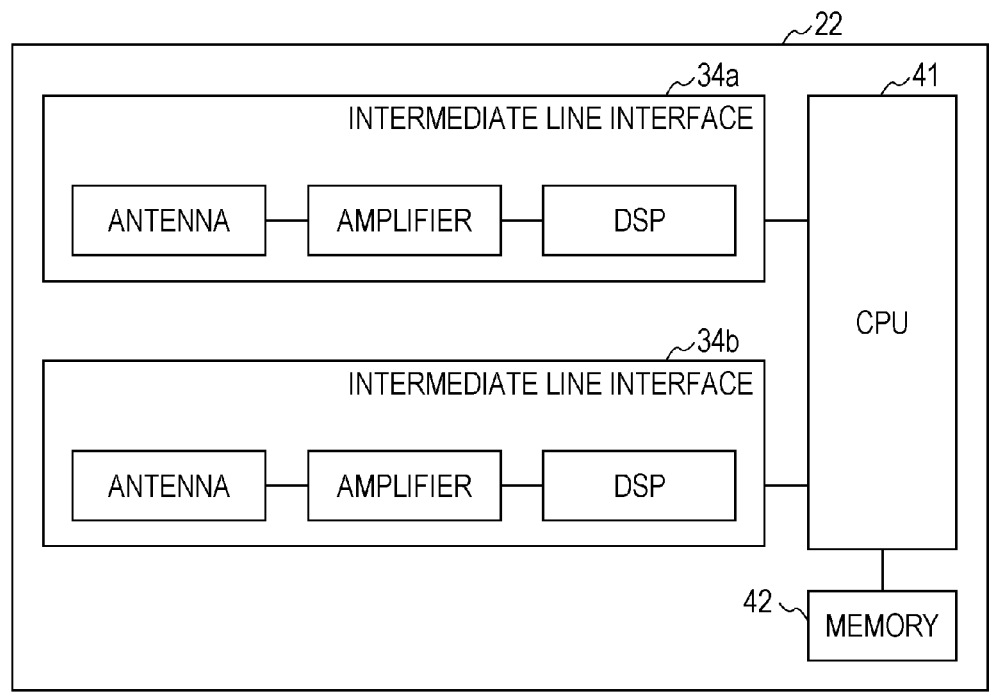
FIG. 6 is a diagram illustrating a hardware configuration of the relay device according to the first embodiment.

FIG. 6 is a diagram illustrating a hardware configuration of each of the relay devices according to the first embodiment.

As illustrated in FIG. 6, the relay devices 22 each include a CPU 41, a memory 42 and intermediate line interfaces 34. The intermediate line interfaces 34 illustrated in FIG. 6 are the same as the intermediate line interfaces 34 illustrated in FIG. 5.

The CPU 41 achieves functions (described later) of a packet receiver 71, a packet transmitter 73, a reception-acknowledgement information receiver 74, a controller 75 and a reception-acknowledgement information transferrer 76. The packet receiver 71, the packet transmitter 73, the reception-acknowledgement information receiver 74, the controller 75 and the reception-acknowledgement information transferrer 76 are included in each of the relay devices 22. The memory 42 includes a buffer memory 72 that temporarily stores a packet received by the interested relay device 22.

Figure 7:
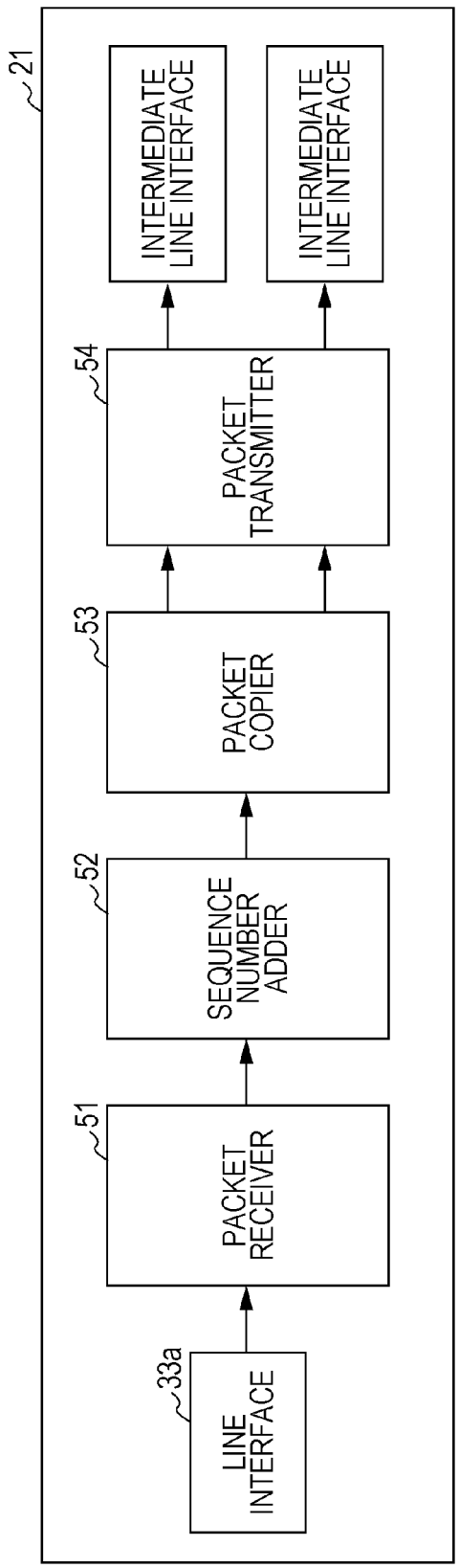
FIG. 7 is a block diagram illustrating the transmitting device according to the first embodiment.

FIG. 7 is a block diagram illustrating the transmitting device according to the first embodiment.

As illustrated in FIG. 7, the transmitting device 21 includes the packet receiver 51, the sequence number adder 52, the packet copier 53, the packet transmitter 54, a line interface 33a and the intermediate line interfaces 34.

The packet receiver 51 receives a packet from the line interface 33a. The sequence number adder 52 adds a sequence number to the packet received by the packet receiver 51. The sequence number indicates the order of packets. The packet copier 53 copies the packet having the sequence number added thereto. The packet transmitter 54 transmits the packet copied by the packet copier 53 to the plurality of intermediate communication paths over the intermediate line networks 34.

The configuration of a format of a packet that is processed by the transmitting device 21 is described with reference to FIG. 10. An IP packet 81 that is received by the packet receiver 51 includes data 84 and an IP header 85. The sequence number adder 52 receives the IP packet 81 and adds a sequence number (SN) 86 to the IP packet 81 so as to generate a packet 82. The packet 82 that has the sequence number 86 added thereto is copied by the packet copier 53. After that, the packet transmitter 54 adds a header 87 and a trailer 88 to the packet 82 so as to generate a packet 83. The header 87 includes information on the interested packet. The packet transmitter 54 transmits the packet 83 to the intermediate line interfaces 34. The header 87 includes information of a destination of the packet and information of the length of the packet, while the trailer 88 includes an error detection code.

FIG. 8 is a block diagram illustrating the receiving device according to the first embodiment.

As illustrated in FIG. 8, the receiving device 23 includes the packet receiver 61, the sequence number extractor 62, the packet selector 63, the packet transmitter 64, the reception-acknowledgement information generator 65, the reception-acknowledgement information transmitter 66, the received sequence number management table 67, the reception-acknowledgement information management table 68, the interface group table 69, a line interface 33b and the intermediate line interfaces 34.

The packet receiver 61 receives packets from the plurality of intermediate line interfaces 34. In addition, the packet receiver 61 adds, to the packets, information that indicates the intermediate line interfaces from which the packet receiver 61 has received the packets. The sequence number extractor 62 references the sequence numbers from the packets output from the packet receiver 61 and outputs the referenced sequence numbers to the reception-acknowledgement information generator 65. In addition, the sequence number extractor 62 outputs the packets having the sequence numbers added thereto to the packet selector 63. The packet selector 63 extracts the sequence numbers from the packets output from the sequence number extractor 62. The packet selector 63 selects a packet to be transferred to a downstream-side node and discards the sequence numbers. The packet transmitter 64 outputs the packet to the line interface 33b. The reception-acknowledgement information generator 65 generates reception-acknowledgement information based on the sequence numbers extracted by the sequence number extractor 63. The generated reception-acknowledgement information includes the sequence numbers extracted by the sequence number extractor 63 and flow IDs that indicate sequences of the packets. The reception-acknowledgement information transmitter 66 outputs the reception-acknowledgement information generated by the reception-acknowledgement information generator 65 to at least one of the intermediate line interfaces 34a and 34b. In this case, the at least one of the intermediate line interfaces, which transmits the reception-acknowledgement information, includes a path other than the intermediate line interfaces that have received the packets.

Since the receiving device 23 transmits an ACK (reception-acknowledgement information) to the path other than the intermediate line interfaces that have received the packets, the receiving device 23 may notify a relay device to which the ACK is transmitted of the fact that the receiving device 23 has received the packets.

The various tables that are held by the receiving device according to the first embodiment are described with reference to FIGS. 11 to 13. The tables are stored in the memory that is included in the receiving device 23.

First, the received sequence number management table 67 is described with reference to FIG. 11.

The received sequence number management table 67 stores a flow ID 91 and a received sequence number 92 as illustrated in FIG. 11, while the flow ID 91 is associated with the received sequence number 92. The flow ID 91 is an ID that identifies a sequence of packets having consecutive sequence numbers added thereto. For example, flow that corresponds to the flow ID 91 may be identified based on a combination of an address of the transmitting device and an address of the receiving device. The received sequence number 92 indicates the maximum sequence number of received packets of each of flows.

Next, the reception-acknowledgement information management table 68 is described with reference to FIG. 12.

The reception-acknowledgement information management table 68 stores a flow ID 93 and a reception acknowledgement sequence number 94 as illustrated in FIG. 12, while the flow ID 93 is associated with the reception acknowledgement sequence number 94. The flow ID 93 is an ID that identifies a sequence of packets having consecutive sequence numbers added thereto. For example, flow that corresponds to the flow ID 93 may be identified based on the combination of the address of the transmitting device and the address of the receiving device. The reception acknowledgement sequence number 94 indicates the maximum sequence number of packets that have been received by the receiving device and acknowledged based on reception-acknowledgement information generated by the receiving device.

The received sequence number management table 67 and the reception-acknowledgement information management table 68 may be made up of a single table.

Lastly, the interface group table 69 is described with reference to FIG. 13.

The interface group table 69 stores a flow ID 95 and a line interface group 96, while the flow ID 95 is associated with the line interface group 96. The flow ID 95 is an ID that identifies a sequence of packets having consecutive sequence numbers added thereto. For example, flow that corresponds to the flow ID 95 may be identified by the combination of the address of the transmitting device and the address of the receiving device. The line interface group 96 indicates line interfaces to which the packets that correspond to the interested flow ID are copied and transmitted.

For example, it is assumed that a packet of flow #1 is received by a line interface #1. Based on this assumption, when the interface group table 69 is referenced, line interfaces that are indicated by the interested line interface group 69 are the line interface #1 and a line interface #2. The packet that is transmitted to a path of the line interface #2 is delayed or lost. Thus, it is necessary to transmit reception-acknowledgement information to at least the line interface #2.

FIG. 9 is a block diagram illustrating the relay device according to the first embodiment.

As illustrated in FIG. 9, the relay device 22 includes the packet receiver 71, the buffer memory 72, the packet transmitter 73, the reception-acknowledgement information receiver 74, the controller 75, the reception-acknowledgement information transferrer 76, a reception-acknowledgement information management table 77 and the intermediate line interfaces 34.

The packet receiver 71 receives a packet from the intermediate line interface 34. The controller 75 basically controls the packet accumulated in the buffer memory 72 in accordance with a first in first out (FIFO) algorithm. According to the FIFO algorithm, written data is read in order of writing the data. Specifically, the packet transmitter 73 reads packets accumulated in the buffer memory 72 in order of accumulating the packets under control of the controller 75 (described later). The controller 75 may reference header information of the packets and control priorities of the packets based on the header information. The packet transmitter 73 transmits the packet read from the buffer memory 72 to the intermediate line interface 34. The reception-acknowledgement information receiver 74 receives reception-acknowledgement information that has been received from the receiving device 23 by the intermediate line interface 34 of the relay device 22. The controller 75 controls writing and reading of a packet in and from the buffer memory 72 for each of flows. In addition, the controller 75 discards a packet stored in the buffer memory 72 based on the reception-acknowledgement information received by the reception-acknowledgement information receiver 74. Furthermore, the controller 75 causes the reception-acknowledgement information transferrer 76 to transfer the reception-acknowledgement information to an upstream-side node (communication device). The reception-acknowledgement information transferrer 76 transfers the reception-acknowledgement information to the upstream-side node under control of the controller 75. The reception-acknowledgement information management table 77 is the same as the reception-acknowledgement information management table described above.

When the thus-configured relay device that receives an ACK (reception-acknowledgement information) identifies, based on the ACK, that the receiving device has received a packet of an interested flow, the relay device does not transfer the same packet as the packet received by the receiving device and may discard the same packet as the packet received by the receiving device. Specifically, when the relay device according to the present embodiment receives the ACK from the receiving device, the relay device does not need to transfer the unnecessary packet.

Operations of the receiving device according to the first embodiment are described with reference to FIGS. 14 to 17.

Figures 13, 14:
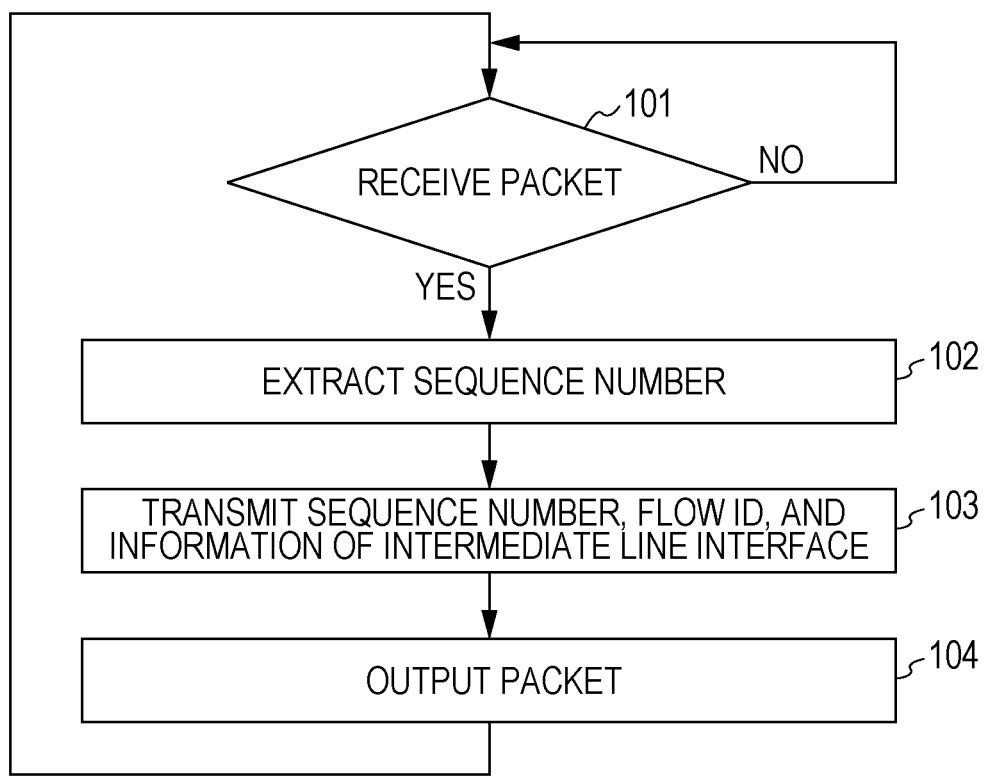
FIG. 13 is a diagram illustrating an interface group table that is included in the receiving device according to the first embodiment.
FIG. 14 is a diagram illustrating a method for performing a process of extracting a sequence number in the receiving device according to the first embodiment.

FIG. 14 illustrates a method for performing a process of extracting a sequence number, while the process is performed by the sequence number extractor 62 of the receiving device 23.

The sequence number extractor 62 receives a packet from the packet receiver 61 (in operation 101) and extracts a sequence number added to the packet (in operation 102). In this case, the sequence number extractor 62 acquires information of an intermediate line interface from which the packet receiver 61 has received the packet.

The sequence number extractor 62 notifies the reception-acknowledgement information generator 65 of the extracted sequence number, a flow ID of the received packet, and the information of the intermediate line interface from which the packet receiver 61 has received the packet (in operation 103).

The sequence number extractor 62 transfers, to the packet selector 63, the packet having the sequence number added thereto (in operation 104).

Figure 15:
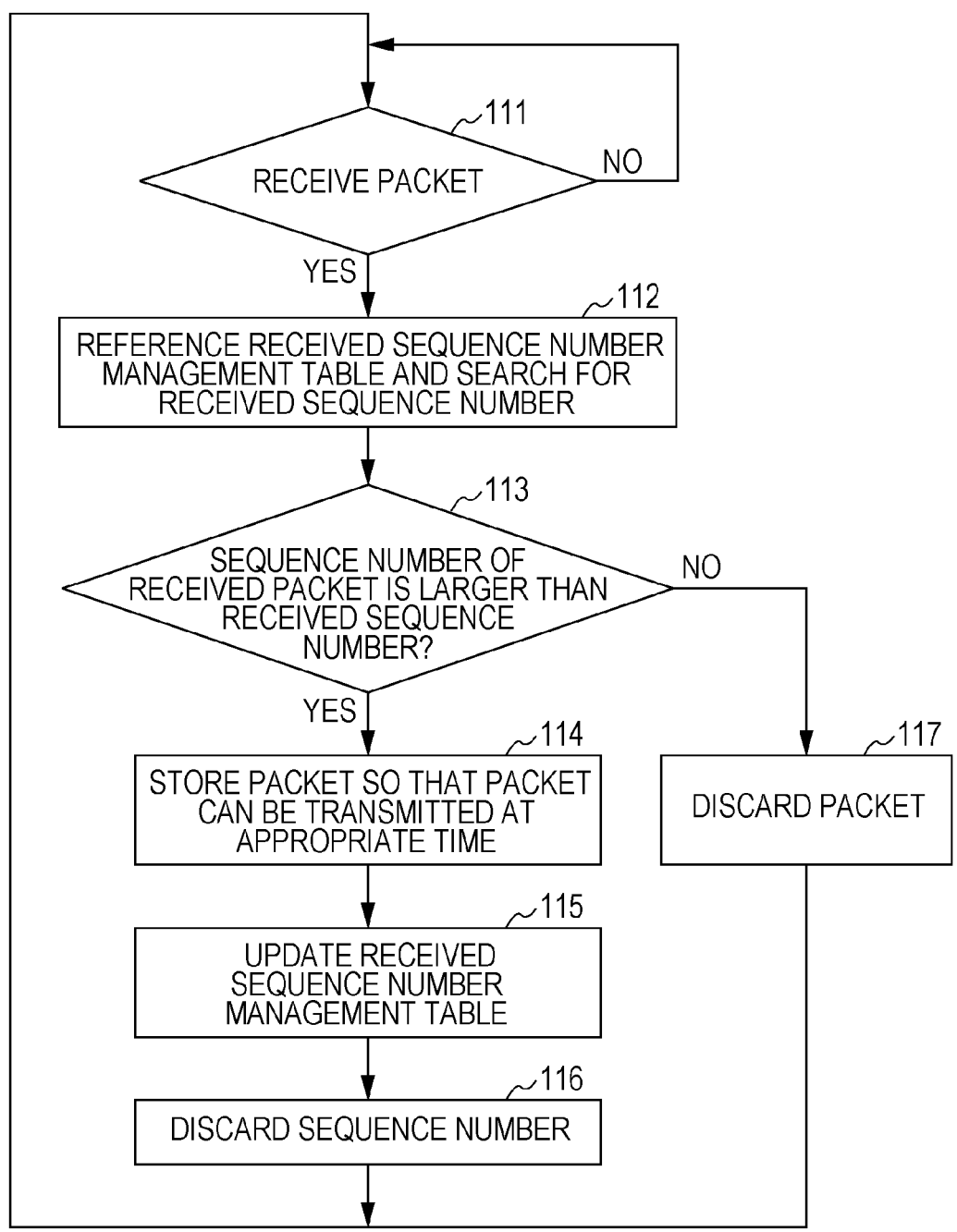
FIG. 15 is a diagram illustrating a method for performing a process of selecting a packet in the receiving device according to the first embodiment.

FIG. 15 illustrates a method for performing a process of selecting a packet, while the process is performed by the packet selector 63 of the receiving device 23.

The packet selector 63 receives the packet having the sequence number added thereto from the sequence number extractor 62 (in operation 111). The packet selector 63 acquires the address of the transmitting device and the address of the receiving device from the packet and obtains a flow ID that corresponds to the address of the transmitting device and the address of the receiving device. The packet selector 63 uses the flow ID as a key and searches the received sequence number management table 67 for a received sequence number 92 associated with the flow ID (in operation 112).

The packet selector 63 compares the sequence number of the received packet with the received sequence number obtained in operation 112 (in operation 113).

As a result of the comparison made in operation 113, when the sequence number of the received packet is larger than the received sequence number obtained in operation 112, the packet selector 63 causes the received packet to be stored in the memory so that the packet may be transmitted at an appropriate time (in operation 114). In addition, the packet selector 63 replaces the received sequence number of the received sequence number management table 67 with the sequence number of the received packet and updates the received sequence number management table 67 (in operation 115). The packet selector 63 discards the sequence number added to the packet (in operation 116).

As a result of the comparison made in operation 113, when the sequence number of the received packet is smaller than the received sequence number obtained in operation 112, the packet selector 63 discards the received packet (in operation 117).

Figure 16:
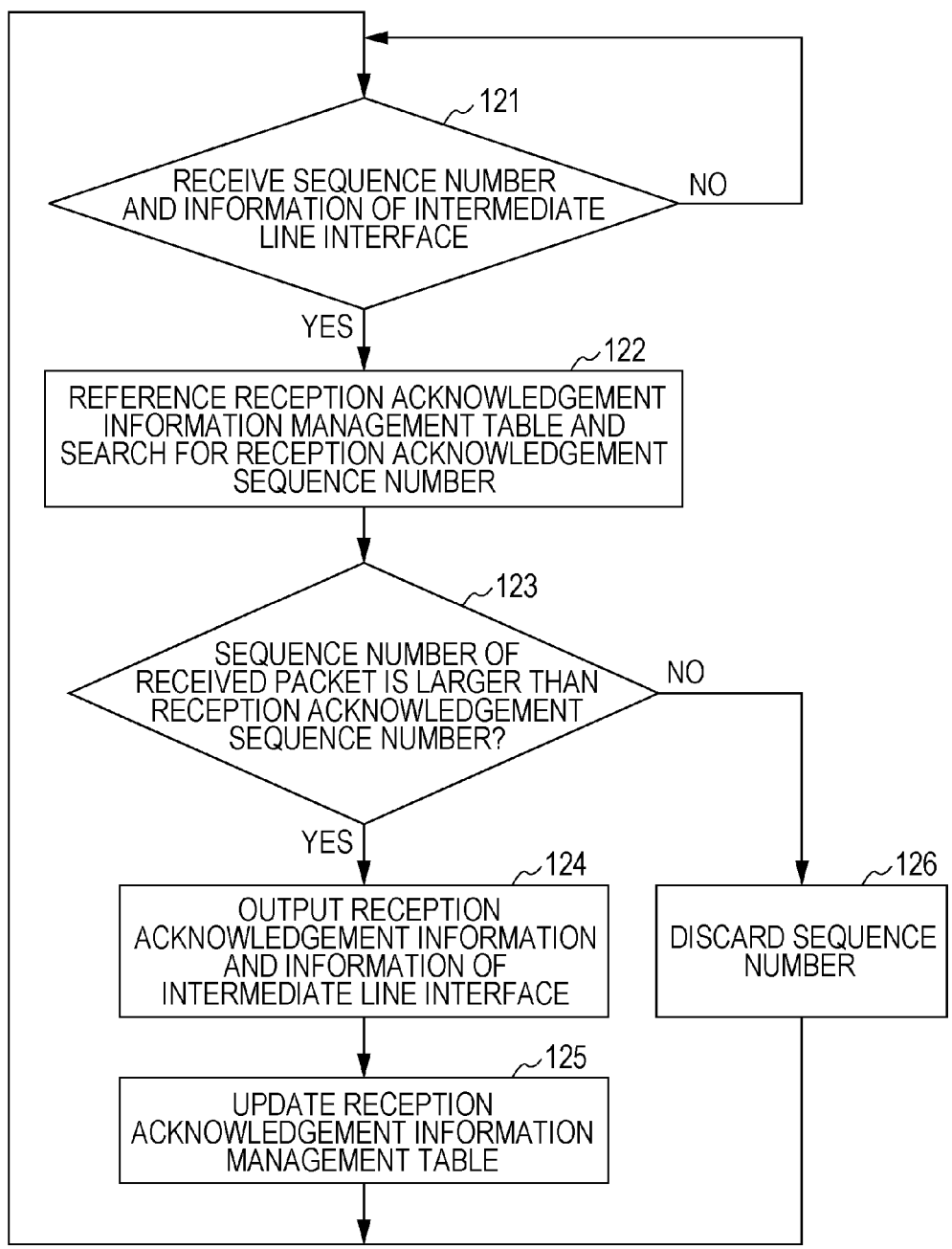
FIG. 16 is a diagram illustrating a method for performing a process of generating reception-acknowledgement information in the receiving device according to the first embodiment.

FIG. 16 illustrates a method for performing a process of generating reception-acknowledgement information, while the process is performed by the reception-acknowledgement information generator 65 of the receiving device 23.

The reception-acknowledgement information generator 65 receives the sequence number and the information of the intermediate line interface from the sequence number extractor 62 (in operation 121). The reception-acknowledgement information generator 65 references the reception-acknowledgement information management table 68 and searches the reception-acknowledgement information management table 68 for an interested reception acknowledgement sequence number (in operation 122).

Next, the reception-acknowledgement information generator 65 compares the sequence number of the received packet with the reception acknowledgement sequence number searched in the reception-acknowledgement information management table 68 (in operation 123).

As a result of the comparison made in operation 123, when the sequence number of the received packet is larger than the reception acknowledgement sequence number, the reception-acknowledgement information generator 65 generates reception-acknowledgement information and notifies the reception-acknowledgement information transmitter 66 of the reception-acknowledgement information and the information of the intermediate line interface (in operation 124). In addition, the reception-acknowledgement information generator 65 replaces the reception acknowledgement sequence number of the reception-acknowledgement information management table 68 with the sequence number of the received packet and updates the reception-acknowledgement information management table 68 (in operation 125).

As a result of the comparison made in operation 123, when the sequence number of the received packet is smaller than the reception acknowledgement sequence number, the reception-acknowledgement information generator 65 discards the sequence number of the received packet (in operation 126).

In the present embodiment, the reception-acknowledgement information generator 65 receives the sequence number and the information of the intermediate line interface from the sequence number extractor 62. However, when the packet selector 63 does not discard the packet, the reception-acknowledgement information generator 65 may generate the reception-acknowledgement information.

Figure 17:
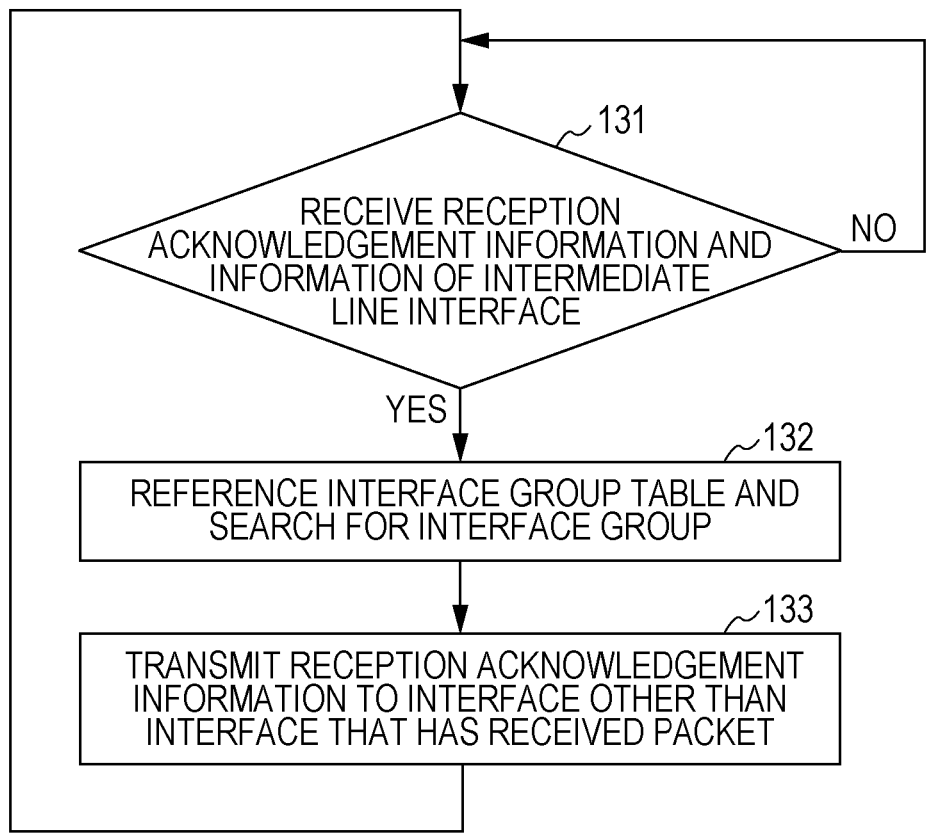
FIG. 17 is a diagram illustrating a method for performing a process of transmitting the reception-acknowledgement information in the receiving device according to the first embodiment.

FIG. 17 illustrates a method for performing a process of transmitting the reception-acknowledgement information, while the process is performed by the reception-acknowledgement information transmitter 66 of the receiving device 23.

The reception-acknowledgement information transmitter 66 receives the reception-acknowledgement information and the information of the intermediate line interface from the reception-acknowledgement information generator 65 (in operation 131). The reception-acknowledgement information transmitter 66 references the interface group table 69 and searches the interface group table 69 for an interface group for transmitting the reception-acknowledgement information (in operation 132).

The reception-acknowledgement information transmitter 66 transmits the reception-acknowledgement information to at least an intermediate line interface other than the intermediate line interface that has received the packet (in operation 133).

In the present embodiment, the reception-acknowledgement information transmitter 66 may transmit the reception-acknowledgement information to the intermediate line interface that has received the packet and an intermediate line interface other than the intermediate line interface that has received the packet. Thus, the reception-acknowledgement information transmitter 66 may notify an upstream-side communication device (coupled to the intermediate line interface that has received the packet) that the receiving device 23 has received the packet.

In addition, it is preferable that the reception-acknowledgement information be transmitted to a relay device other than a relay device that is located on a path from which the receiving device 23 has received the packet. In addition, it is preferable that a distance between the relay devices be sufficiently large. This reduces a possibility that wireless environments of the plurality of paths simultaneously become worse. Thus, the effectiveness of the technique disclosed herein is easily provided.

The relay device according to the first embodiment is described with reference to FIGS. 18 and 19.

FIG. 18 illustrates a method for performing a process of controlling reception-acknowledgement information upon reception of the reception-acknowledgement information, while the process is performed by the controller 75 of the relay device 22.

The controller 75 receives reception-acknowledgement information from the reception-acknowledgement information receiver 74 (in operation 141) and acquires, from the reception-acknowledgement information, a sequence number of a packet completely received by the receiving device 23 and a flow ID of the packet (in operation 142).

The controller 75 compares the acquired sequence number with the maximum sequence number of packets that correspond to the interested flow and are stored in the buffer memory 72 (in operation 143).

As a result of the comparison made in operation 143, when the acquired sequence number is larger than the maximum sequence number, the controller 75 discards a packet having a smaller sequence number than the acquired sequence number (in operation 144). Then, the controller 75 updates a reception acknowledgement sequence number 94 that is associated with the flow ID of the interested flow and included in the reception-acknowledgement information management table 68 (in operation 145). The controller 75 causes the reception-acknowledgement information transferrer 76 to transfer the reception-acknowledgement information to an upstream-side communication device (in operation 146).

As a result of the comparison made in operation 143, when the acquired sequence number is smaller than the maximum sequence number, the controller 75 compares the acquired sequence number with the packets that correspond to the interested flow and are stored in the buffer memory 72 (in operation 147).

As a result of the comparison made in operation 147, when the acquired sequence number is equal to or larger than the minimum value of sequence numbers of the packets that correspond to the interested flow and are stored in the buffer memory 72 and is equal to or smaller than the maximum value of the sequence numbers of the packets that correspond to the interested flow and are stored in the buffer memory 72, the controller 75 discards a packet having a sequence number that is equal to or smaller than the acquired sequence number (in operation 148), and the controller 75 discards the reception-acknowledgement information (in operation 149).

As a result of the comparison made in operation 147, when the acquired sequence number is smaller than the minimum value of the sequence numbers of the packets that correspond to the interested flow and are stored in the buffer memory 72, the controller 75 discards the reception-acknowledgement information (in operation 150).

FIG. 19 illustrates a method for performing a process of controlling a packet upon reception of the packet, while the process is performed by the controller 75 of the relay device 22.

When the controller 75 receives a packet (in operation 161), the controller 75 compares a sequence number of the received packet with a reception acknowledgement sequence number that is included in the reception-acknowledgement information management table 77 and corresponds to an interested flow (in operation 162).

As a result of the comparison made in operation 162, when the sequence number of the received packet is equal to or smaller than the reception acknowledgement sequence number, the controller 75 discards the packet (in operation 163).

As a result of the comparison made in operation 162, when the sequence number of the received packet is larger than the reception acknowledgement sequence number, the controller 75 causes the packet to be stored in the buffer memory 72 and prepares transfer of the packet (in operation 164).

In addition, when the relay device has already transmitted a part of the packet that corresponds to the reception-acknowledgement information received from the receiving device, the relay device may discard an unsent part of the packet. This prevents waste of a wireless resource.

According to the first embodiment, the same packet is transmitted over redundant communication paths, and the receiving device receives the packet over a communication path and transmits the ACK to a communication path other than the communication path over which the receiving device has received the packet. Thus, the receiving device may notify an upstream-side node that the receiving device has received the packet. The relay device discards the same packet as the packet received by the receiving device. This prevents an unnecessary packet from being transferred. Therefore, according to the first embodiment, wireless resources may be efficiently used for transfer of packets.

It is preferable that a plurality of redundant paths that are located between the transmitting device and the receiving device do not join together in the packet transfer device according to the present embodiment. In this case, since the packet transfer according to the present embodiment is performed in an environment in which a packet is easily lost or delayed, the effect is noticeable.

A second embodiment is described with reference to FIGS. 20 to 22. A receiving device and a relay device according to the second embodiment are examples of the invention. The second embodiment is different from the first embodiment in the following features: reception-acknowledgement information to be generated by the reception-acknowledgement information generator 65; and the reception-acknowledgement information management table 68. In description of the second embodiment, the following diagrams are the same as those described in the first embodiment with reference to FIGS. 3 to 11, 13 to 15, and 17 to 19. The diagrams are; an entire network, an outline diagram, a hardware configuration, a block diagram, a format of a packet, a received sequence number management table, an interface group table, a process flow to be performed by the sequence number extractor, a process flow to be performed by the packet selector, and a process flow to be performed by the reception-acknowledgement information transmitter. In the following description, parts that are the same as the parts described in the first embodiment are indicated by the same reference numerals as in the first embodiment, and a description thereof is omitted.

In the second embodiment, the reception-acknowledgement information generator 65 of the receiving device 23 transmits, at each of constant periodic time intervals, reception-acknowledgement information to at least a path other than a path from which the receiving device 23 has received a packet. Alternatively, in the second embodiment, every time the receiving device 23 receives a certain number (of two or more) of packets of the same flow, the reception-acknowledgement information generator 65 of the receiving device 23 transmits reception-acknowledgement information to at least a path other than a path from which the receiving device 23 has received the packets. For these cases, the reception-acknowledgement information generator 65 has a non-reception acknowledgement counter.

The non-reception acknowledgement counter counts the number of received packets in order to transmit reception-acknowledgement information every time the receiving device 23 receives the certain number of packets. For example, it is assumed that the reception-acknowledgement information generator 65 generates reception-acknowledgement information when the receiving device 23 receives 10 packets. Based on this assumption, the non-reception acknowledgement counter counts the number of the received packets when the reception-acknowledgement information generator 65 receives sequence numbers extracted by the sequence number extractor 62.

Flows of processes to be performed by the reception-acknowledgement information generator 65 according to the second embodiment are described with reference to FIGS. 20 to 22.

FIG. 20 illustrates a reception-acknowledgement information management table according to the second embodiment.

As illustrated in FIG. 20, the reception-acknowledgement information management table 170 stores a flow ID 171, a consecutive reception acknowledgement sequence number 172 and a selection reception acknowledgement bitmap 173, while the flow ID 171, the consecutive reception acknowledgement sequence number 172 and the selection reception acknowledgement bitmap 173 are associated with each other.

The consecutive reception acknowledgement sequence number 172 indicates that packets that have sequence numbers that are equal to or smaller than the consecutive reception acknowledgement sequence number 172 have been received by the receiving device 23.

The selection reception acknowledgement bitmap 173 has a most significant bit that indicates a sequence number that is larger by 1 than the consecutive reception acknowledgement sequence number 172. In addition, the selection reception acknowledgement bitmap 173 has a least significant bit that indicates a sequence number that is larger by 16 than the consecutive reception acknowledgement sequence number 172 (when the bitmap has 16 bits).

When a bit of the selection reception acknowledgement bitmap 173 is 0, the bit indicates that a packet that has a sequence number corresponding to the bit is not received by the receiving device 23. When a bit of the selection reception acknowledgement bitmap 173 is 1, the bit indicates that a packet that has a sequence number corresponding to the bit has been received by the receiving device 23.

In an example illustrated in FIG. 20, packets that correspond to flow #1 and have sequence numbers of up to 245 have been consecutively received by the receiving device 23; a packet that corresponds to the flow #1 and has a sequence number of 246 is not received by the receiving device 23; a packet that corresponds to the flow #1 and has a sequence number of 247 has been received by the receiving device 23; and a packet that corresponds to the flow #1 and has a sequence number of 261 is not received by the receiving device 23.

Figure 21:
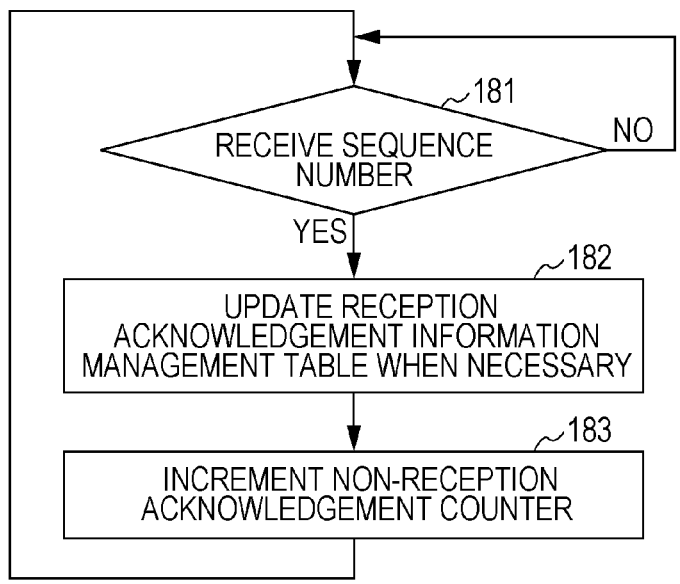
FIG. 21 is a diagram illustrating a method for performing a process of generating reception-acknowledgement information upon reception of information of a sequence number in a receiving device according to the second embodiment.

FIG. 21 illustrates a method for performing a process of generating reception-acknowledgement information upon reception of information of a sequence number, while the process is performed by the reception-acknowledgement information generator 65 of the receiving device 23.

When the reception-acknowledgement information generator 65 receives information of a sequence number from the sequence number extractor 62 (in operation 181), the reception-acknowledgement information generator 65 updates the reception-acknowledgement information management table 170 when necessary (in operation 182). Then, the reception-acknowledgement information generator 65 increments the non-reception acknowledgement counter (in operation 183).

For example, it is assumed that the reception-acknowledgement information generator 65 receives a sequence number of 10 from the intermediate line interface 34a and receives the same sequence number of 10 from the intermediate line interface 34b after the reception of the sequence number of 10 from the intermediate line interface 34a. Based on this assumption, the reception-acknowledgement information generator 65 updates the reception-acknowledgement information management table 170 based on the first reception of the sequence number of 10 from the intermediate line interface 34a. Thus, the reception-acknowledgement information generator 65 does not need to update the reception-acknowledgement information management table 170 when the reception-acknowledgement information generator 65 receives the sequence number of 10 from the intermediate line interface 34b. On the other hand, the reception-acknowledgement information generator 65 needs to update the reception-acknowledgement information management table 170 when the reception-acknowledgement information generator 65 receives a sequence number that is not received by the reception-acknowledgement information generator 65 from the intermediate line interfaces 34a and 34b. Specifically, the reception-acknowledgement information generator 65 changes an interested bit of the bitmap from 0 to 1.

Figure 22:
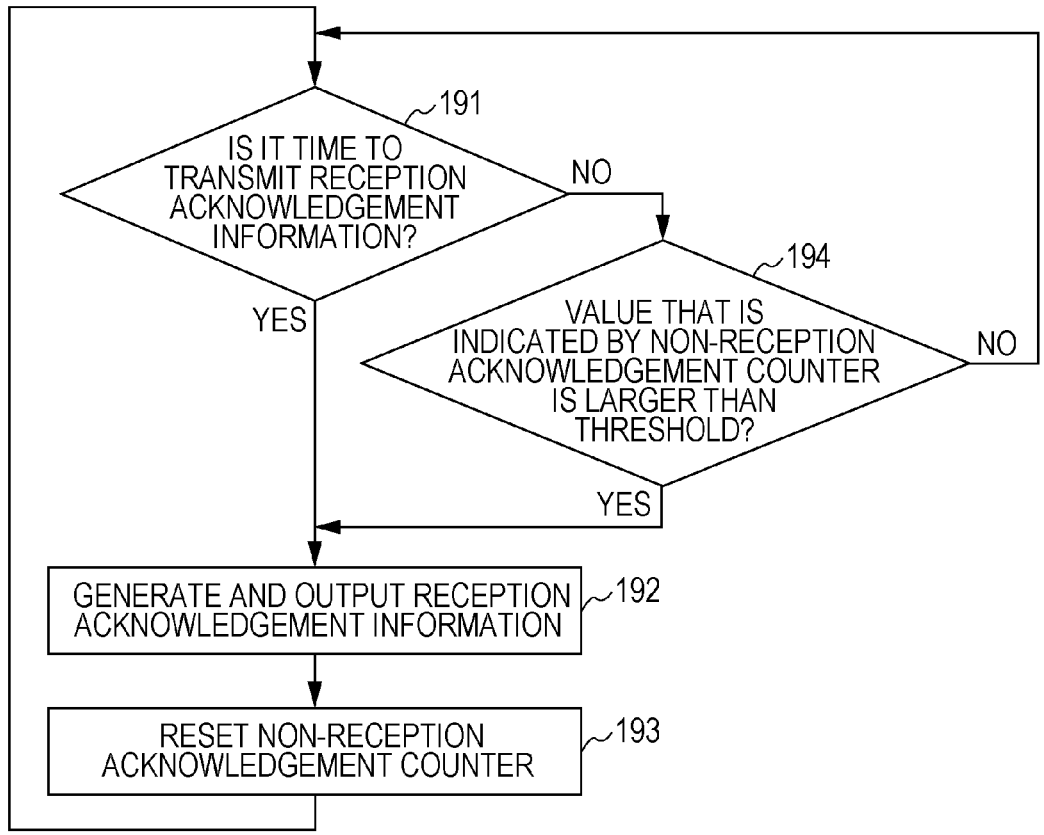
FIG. 22 is a diagram illustrating a method for performing a process of generating reception-acknowledgement information in order to transmit the reception-acknowledgement information in the receiving device according to the second embodiment.

FIG. 22 illustrates a method for performing a process generating reception-acknowledgement information, while the process is performed by the reception-acknowledgement information generator 65 of the receiving device 23 in order to transmit reception-acknowledgement information.

The reception-acknowledgement information generator 65 determines whether or not it is time to transmit reception-acknowledgement information (in operation 191) or whether or not a certain time period elapses after output of the previous reception-acknowledgement information. When it is time to transmit the reception-acknowledgement information, the reception-acknowledgement information generator 65 generates the reception-acknowledgement information based on the reception-acknowledgement information management table 170 and outputs the reception-acknowledgement information to the reception-acknowledgement information transmitter 66 (in operation 192). After the reception-acknowledgement information generator 65 outputs the reception-acknowledgement information, the reception-acknowledgement information generator 65 resets the non-reception acknowledgement counter (in operation 193). In this case, the reception-acknowledgement information generator 65 resets a timer for measuring a time to transmit reception-acknowledgement information.

Even when it is not time to transmit the reception-acknowledgement information in operation 191, the reception-acknowledgement information generator 65 confirms whether or not a value that is indicated by the non-reception acknowledgement counter exceeds a predetermined threshold (in operation 194). When the value that is indicated by the non-reception acknowledgement counter exceeds the predetermined threshold, reception-acknowledgement information generator 65 generates the reception-acknowledgement information based on the reception-acknowledgement information management table 170 and outputs the reception-acknowledgement information to the reception-acknowledgement information transmitter 66 (in operation 192).

After the reception-acknowledgement information generator 65 outputs the reception-acknowledgement information, the reception-acknowledgement information generator 65 resets the non-reception acknowledgement counter (in operation 193). In this case, the reception-acknowledgement information generator 65 sets the timer for measuring a time to transmit reception-acknowledgement information. In addition, when the value that is indicated by the non-reception acknowledgement counter does not exceed the predetermined threshold in operation 194, the process returns to operation 191 so that the reception-acknowledgement information generator 65 determines whether or not it is time to transmit reception-acknowledgement information.

According to the second embodiment, since the receiving device transmits an ACK (reception-acknowledgement information) to an upstream-side node at each of the constant periodic time intervals or every time the receiving device 23 receives the certain number of packets of the same flow, unnecessary loads are not applied to the receiving device, the relay devices and the like, and it is possible to prevent an unnecessary packet from being transferred, compared with the case in which the receiving device transmits an ACK for each of packets received by the receiving device. Thus, according to the second embodiment, wireless resources may be efficiently used for transfer of packets.

A third embodiment is described with reference to FIGS. 23 to 27. A receiving device and a relay device according to the third embodiment are examples of the invention. A transmitting device and the receiving device according to the third embodiment each have a retransmission controller. This feature is different from the first embodiment.

In description of the third embodiment, the following diagrams are the same as those described in the first embodiment with reference to FIGS. 3 to 13, 15 to 17, and 19. The diagrams are; an entire network, an outline diagram, a hardware configuration, a format of a packet, a received sequence number management table, a reception-acknowledgement information management table, an interface group table, a process flow to be performed by the packet selector, a process flow to be performed by the reception-acknowledgement information generator, a process flow to be performed by the reception-acknowledgement information transmitter, and a process flow to be performed by the controller. In the following description, parts that are the same as the parts described in the first embodiment are indicated by the same reference numerals as in the first embodiment, and a description thereof is omitted.

Figure 23:
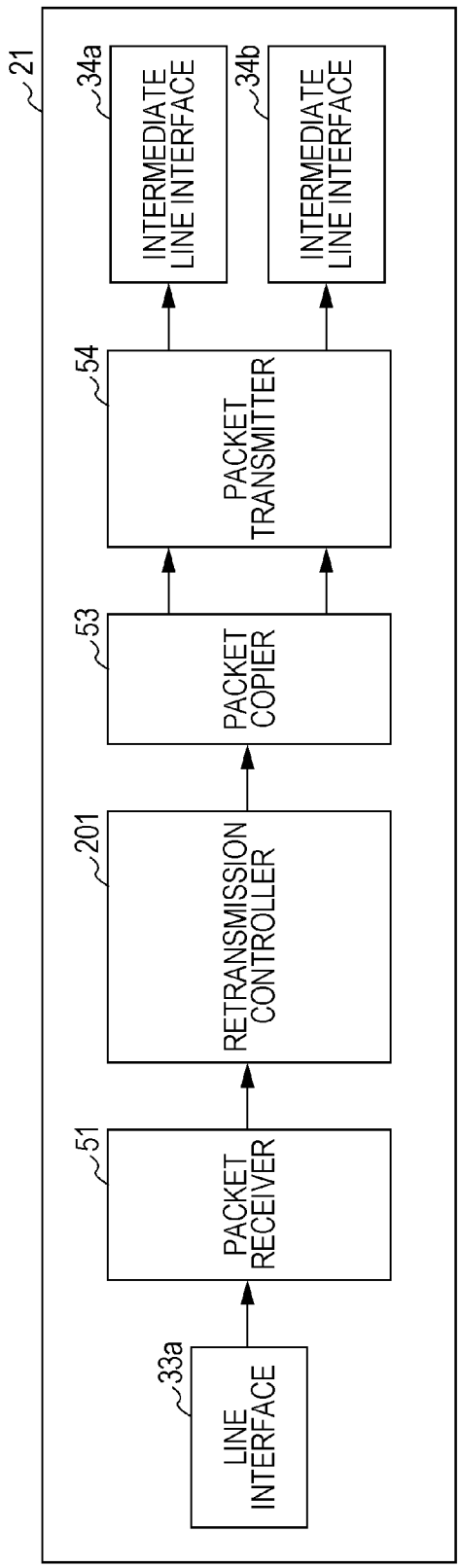
FIG. 23 is a block diagram illustrating a transmitting device according to a third embodiment.

In the third embodiment, the transmitting device 21 has a retransmission controller 201 and the constituent parts of the transmitting device 21 according to the first embodiment, as illustrated in FIG. 23. The retransmission controller 201 adds a sequence number to a packet and retransmits the packet that needs to be retransmitted. In this case, the retransmission controller 201 retransmits the packet using Automatic Repeat-reQuest (ARQ), for example.

Figure 24:
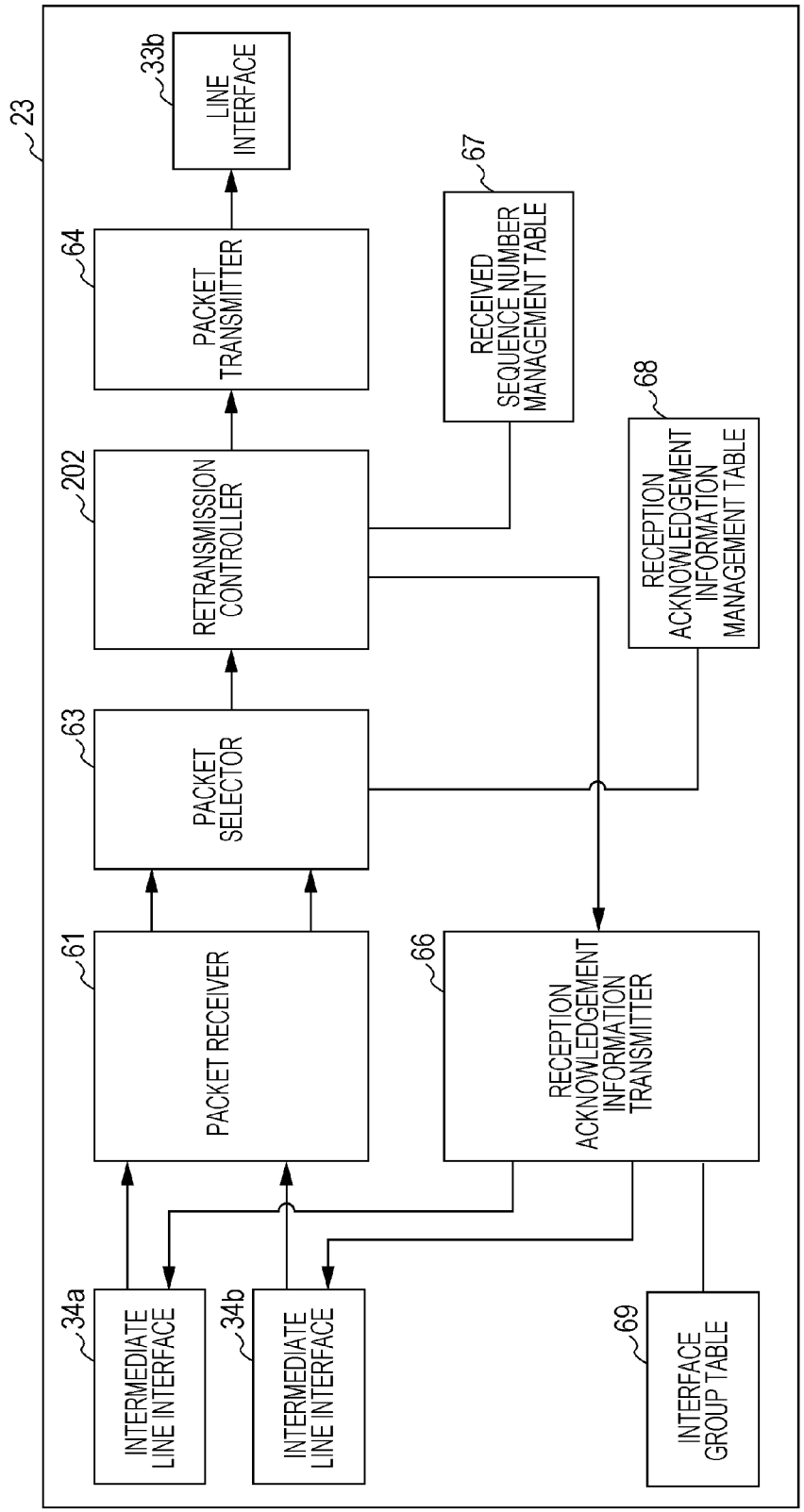
FIG. 24 is a block diagram illustrating a receiving device according to the third embodiment.

In the third embodiment, the receiving device 23 has a retransmission controller 202 and the constituent parts (of the receiving device 23 according to the first embodiment) other than the sequence number extractor, as illustrated in FIG. 24. The retransmission controller 202 updates the reception-acknowledgement information management table 68 upon reception of a packet and acquires or discards a sequence number added to the packet. The retransmission controller 202 generates reception-acknowledgement information and transmits the reception-acknowledgement information to the reception-acknowledgement information transmitter 66.

The configuration of the relay device 22 according to the third embodiment is the same as the configuration of the relay device 22 according to the first embodiment. However, the relay device 22 according to the third embodiment does not discard reception-acknowledgement information and transfers the reception-acknowledgement information to an upstream-side node. This feature is different from the first embodiment.

Figure 25:
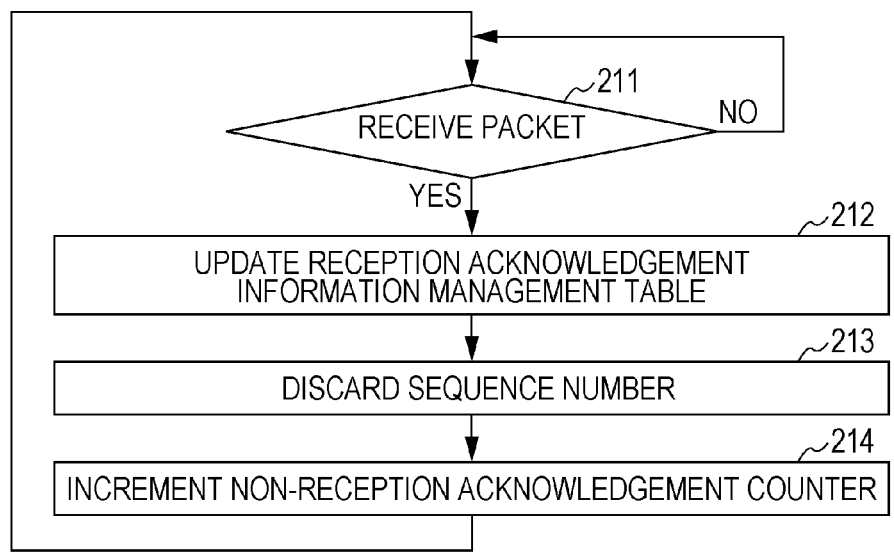
FIG. 25 is a diagram illustrating a method for performing a process of controlling retransmission upon reception of a packet in the receiving device according to the third embodiment.

The flow of a process that is performed by the retransmission controller 202 of the receiving device 23 upon reception of a packet is described with reference to FIG. 25.

When the retransmission controller 202 receives a packet (in operation 211), the retransmission controller 202 references a sequence number added to the packet and updates the reception-acknowledgement information management table 68 (in operation 212). After the retransmission controller 202 updates the reception-acknowledgement information management table 68, the retransmission controller 202 discards the sequence number added to the packet (in operation 213) and increments the non-reception acknowledgement counter (in operation 214).

Figure 26:
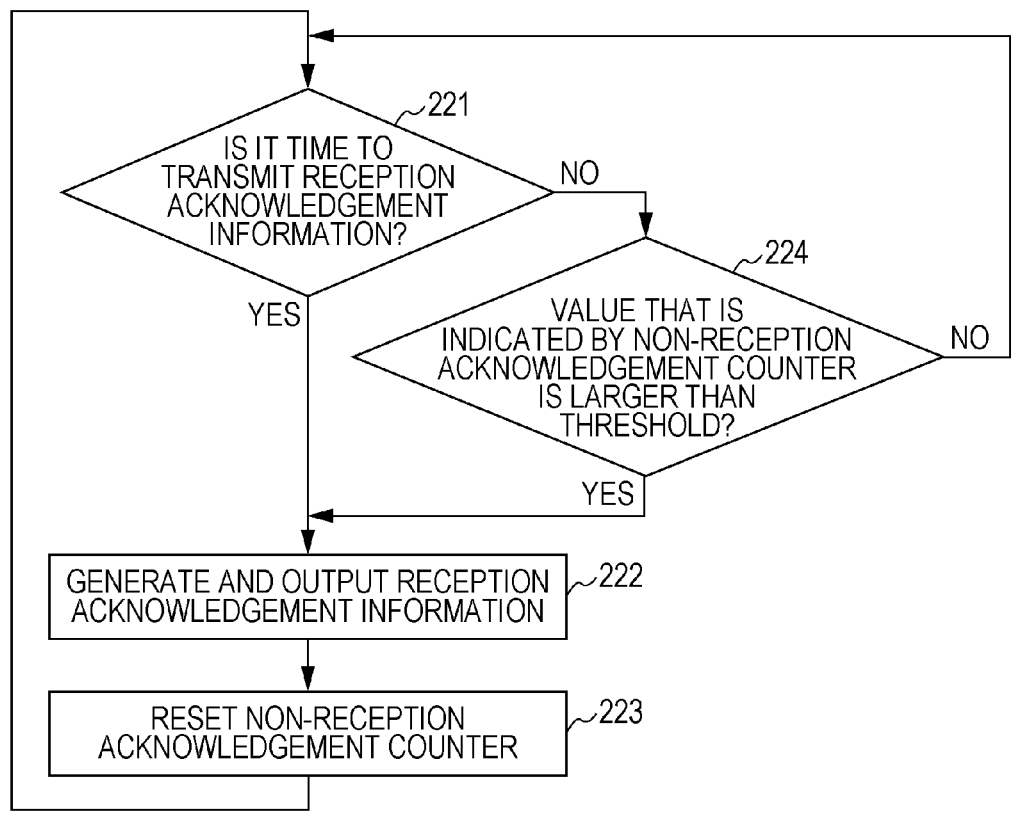
FIG. 26 is a diagram illustrating a method for performing a process of controlling retransmission in order to transmit reception-acknowledgement information in the receiving device according to the third embodiment.

The flow of a process that is performed by the retransmission controller 202 of the receiving device 23 in order to transmit an ACK (reception-acknowledgement information) is described with reference to FIG. 26.

The retransmission controller 202 determines whether or not it is time to transmit an ACK (reception-acknowledgement information) (in operation 221). When it is time to transmit the ACK (reception-acknowledgement information), the retransmission controller 202 generates the reception-acknowledgement information based on the reception-acknowledgement information management table 68 and transmits the reception-acknowledgement information to the reception-acknowledgement information transmitter 66 (in operation 222). After the transmission of the reception-acknowledgement information, the retransmission controller 202 resets the non-reception acknowledgement counter (in operation 223).

Figure 27:
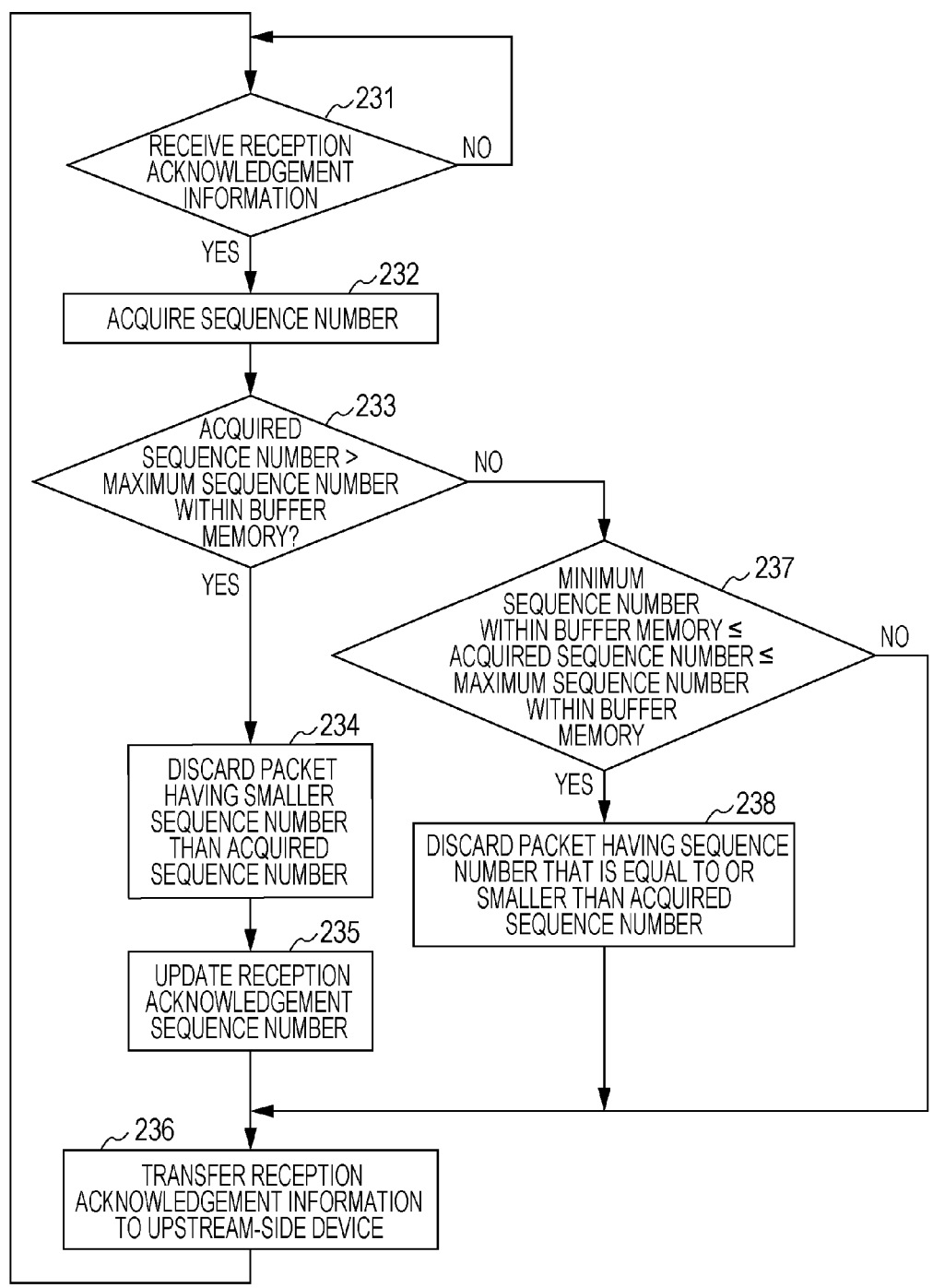
FIG. 27 is a diagram illustrating a method for performing a control process in a relay device according to the third embodiment.

The flow of a process that is performed by the controller 75 of the relay device 22 according to the third embodiment is described with reference to FIG. 27.

The controller 75 receives the reception-acknowledgement information from the reception-acknowledgement information receiver 74 (in operation 231) and acquires, from the reception-acknowledgement information, a sequence number added to the packet completely received by the receiving device 23 (in operation 232).

The controller 75 compares the acquired sequence number with the maximum sequence number of packets that are stored in the buffer memory 72 and correspond to an interested flow (in operation 233).

As a result of the comparison made in operation 233, when the acquired sequence number is larger than the maximum sequence number, the controller 75 discards a packet that has a smaller sequence number than the acquired sequence number (in operation 234). Then, the controller 75 updates a reception acknowledgement sequence number 132 that is included in the reception-acknowledgement information management table 77 and corresponds to the interested flow (in operation 235). The controller 75 causes the reception-acknowledgement information transferrer 76 to transfer the reception-acknowledgement information to an upstream-side communication device (in operation 236).

As a result of the comparison made in operation 233, when the acquired sequence number is smaller than the maximum sequence number, the controller 75 compares the acquired sequence number with the packets that are stored in the buffer memory 72 and correspond to the interested flow (in operation 237). As a result of the comparison made in operation 237, when the acquired sequence number is equal to or larger than the minimum value of sequence numbers of the packets that are stored in the buffer memory 72 and correspond to the interested flow, and is equal to or smaller than the maximum value of the sequence numbers of the packets that are stored in the buffer memory 72 and correspond to the interested flow, the controller 75 discards a packet that has a sequence number that is equal to or smaller than the acquired sequence number (in operation 238). Then, the controller 75 causes the reception-acknowledgement information transferrer 76 to transfer the reception-acknowledgement information to the upstream-side communication device (in operation 236).

As a result of the comparison made in operation 237, when the acquired sequence number is smaller than the minimum value of the sequence numbers of the packets that are stored in the buffer memory 72 and correspond to the interested flow, the controller 75 causes the reception-acknowledgement information transferrer 76 to transfer the reception-acknowledgement information to the upstream-side communication device (in operation 236).

According to the third embodiment, the relay device uses the ACK to be transferred according to the ARQ control and discards a packet. Thus, in the third embodiment, a function that is dedicated to generate an ACK is not necessary in the receiving device provided in the redundant system. Therefore, according to the third embodiment, wireless resources may be efficiently used for transfer of packets in the simple configuration.

A fourth embodiment is described with reference to FIGS. 28 and 29. A receiving device and a relay device according to the fourth embodiment are examples of the invention. The receiving device has a modulation scheme management unit in the fourth embodiment. This feature is different from the first embodiment.

In description of the fourth embodiment, the following diagrams are the same as those described in the first embodiment with reference to FIGS. 3 to 7, 9 to 16, 18, and 19. The diagrams are; an entire network, an outline diagram, a hardware configuration, a block diagram illustrating a transmitting device and a relay device, a format of a packet, a received sequence number management table, a reception-acknowledgement information management table, an interface group table, a process flow to be performed by the sequence number extractor, a process flow to be performed by the packet selector, a process flow to be performed by the reception-acknowledgement information generator, and processes flows to be performed by the controller. In the following description, parts that are the same as the parts described in the first embodiment are indicated by the same reference numerals as in the first embodiment, and a description thereof is omitted.

Figure 28:
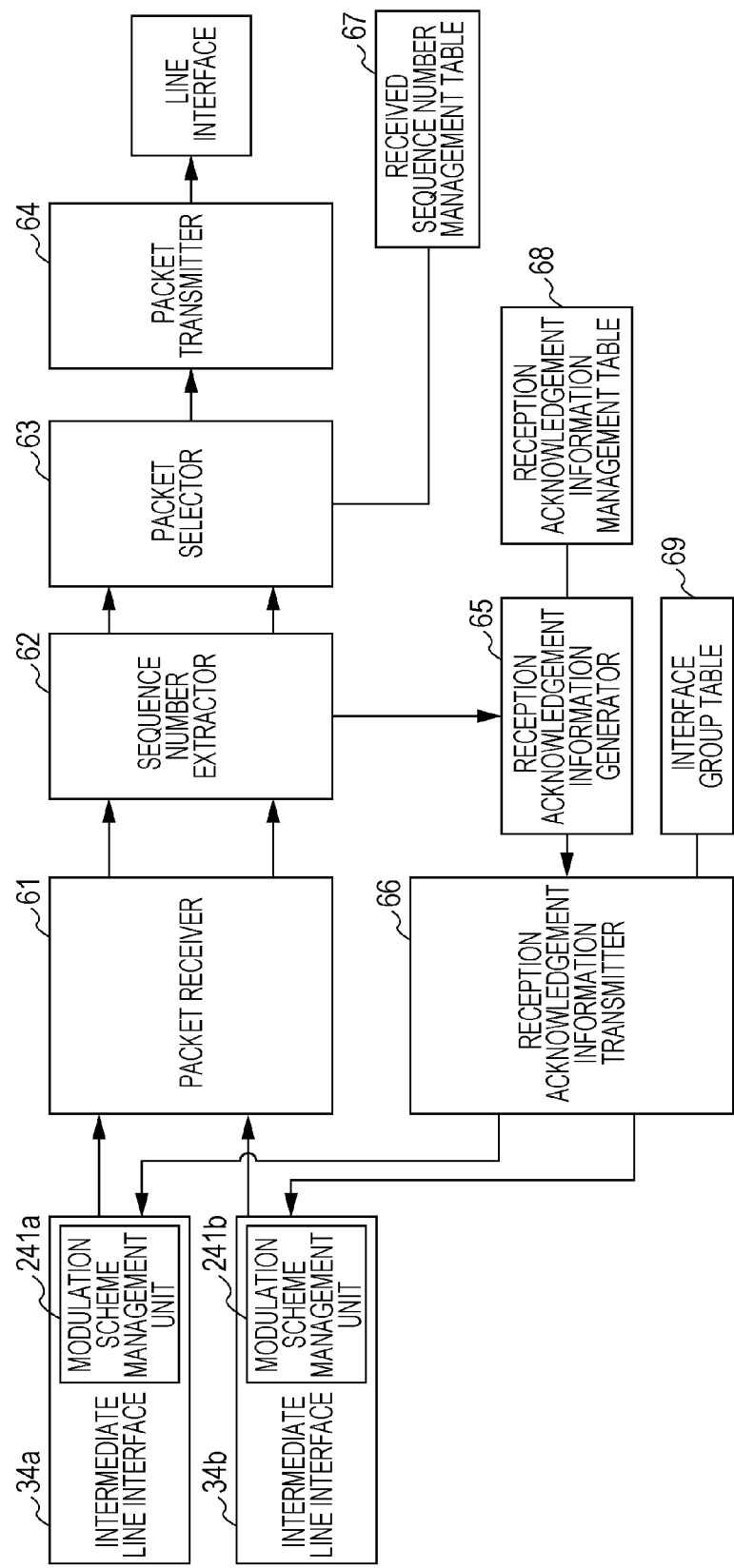
FIG. 28 is a block diagram illustrating a receiving device according to a fourth embodiment.

As illustrated in FIG. 28, the receiving device 23 according to the fourth embodiment has the constituent parts of the receiving device 23 according to the first embodiment and modulation scheme management units 241 that are included in the intermediate line interfaces 34. The modulation scheme management units 241 each determine a modulation scheme based on a communication environment of the interested intermediate line interface, a link rate and the like and instructs an interested relay device to use the determined modulation scheme. In addition, the modulation scheme management units 241 each manage the modulation scheme used by the interested intermediate line interface and output information of the modulation scheme used by the interested intermediate line interface to the reception-acknowledgement information transmitter 66.

The relay device 22 modulates a packet using the modulation scheme in accordance with the instruction provided by the receiving device 23. When the intermediate line interface 34 of the relay device 22 receives, from the receiving device 23, the instruction that specifies the modulation scheme, the DSP 37 modulates a signal (to be transferred) in accordance with the modulation scheme specified by the instruction.

Figure 29:
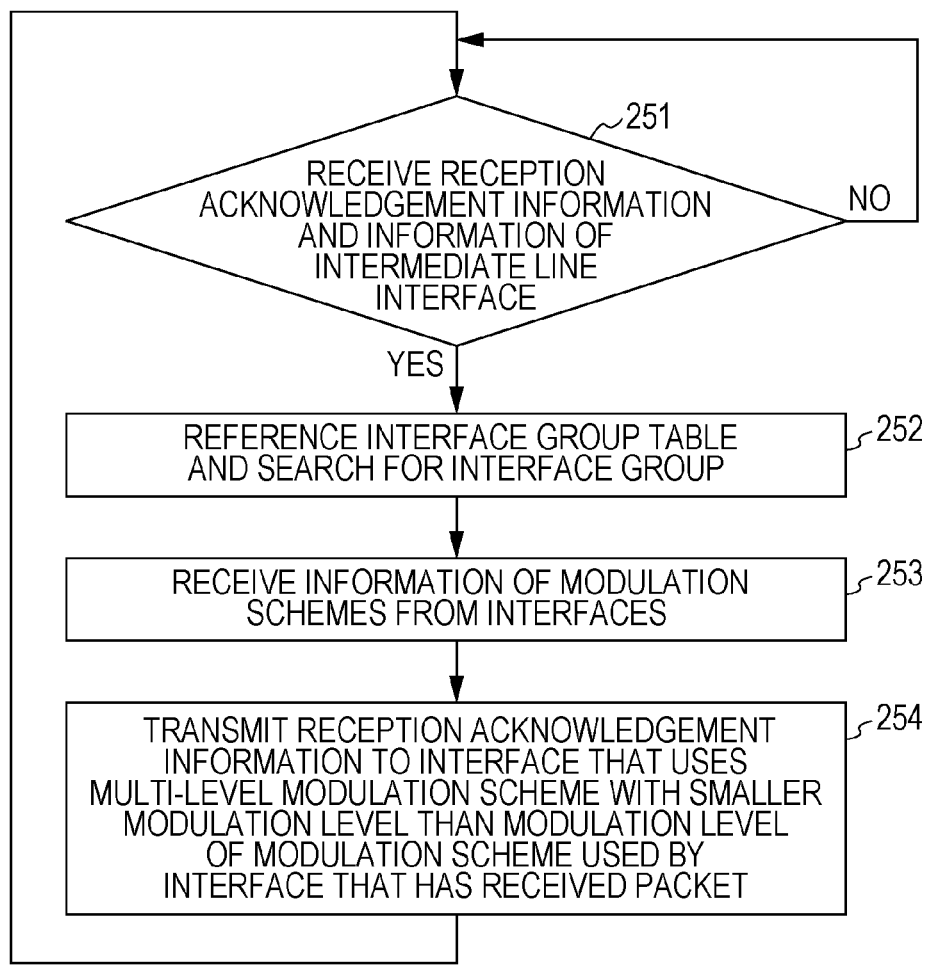
FIG. 29 is a block diagram illustrating a method for performing a control process in the receiving device according to the fourth embodiment in order to transmit reception-acknowledgement information.

FIG. 29 illustrates a method for performing a process of transmitting reception-acknowledgement information, while the process is performed by the reception-acknowledgement information transmitter 66 of the receiving device 23.

The reception-acknowledgement information transmitter 66 receives reception-acknowledgement information and information of an intermediate line interface from the reception-acknowledgement information generator 65 (in operation 251). Then, the reception-acknowledgement information transmitter 66 references the interface group table 69 and searches the interface group table 69 for an interface group for transmitting the reception-acknowledgement information (in operation 252).

The reception-acknowledgement information transmitter 66 receives, from the modulation scheme management units 241 of the intermediate line interfaces 34, information of modulation schemes used by the intermediate line interfaces (in operation 253).

The reception-acknowledgement information transmitter 66 transmits the reception-acknowledgement information to an interface that is not an interface (that has received a packet) and uses a multi-valued modulation scheme with a modulation valued that is smaller than a modulation valued of a modulation scheme that is used by the interface that has received the packet (in operation 254).

According to the fourth embodiment, it is possible to transmit reception-acknowledgement information to an interface that is among intermediate line interfaces other than an intermediate line interface (that has received a packet) and does not receive a packet since the packet is highly likely to be lost or delayed. It is, therefore, possible to prevent waste of a wireless resource.

According to the aforementioned embodiments, the receiving device disclosed herein, the relay device disclosed herein, the reception method disclosed herein, and the relay method disclosed herein each have the effect of efficiently using a wireless resource.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving device coupled to at least one relay device that is located on each of a plurality of paths, said receiving device comprising:
   a packet receiver that is coupled to the plurality of paths to receive a redundant set of one or more packets transmitted through each of the plurality of paths; and
   a packet transmitter that:
      generates reception-acknowledgement information indicating that the packet receiver receives a packet when the packet receiver receives the packet over one of the paths,
      selects a path that is different from the one of the paths among the plurality of paths, and
      transmits the reception-acknowledgement information to the selected path, wherein
   the reception-acknowledgement information includes a maximum value of sequence numbers that are included in packets received by the packet receiver, and
   the reception-acknowledgement information signals a relay device on the selected path to immediately discard upon receiving one or more redundant packets having sequence numbers equal to or less than the maximum value of sequence numbers.

2. The receiving device according to claim 1, wherein the packet transmitter transmits the reception acknowledgement information to the selected path that is among the plurality of paths and uses a smaller multi-valued modulation scheme than a multi-valued modulation scheme that is used by the one of the paths over which the packet receiver has received the packet.

3. The receiving device according to claim 1, wherein the packet transmitter transmits the reception acknowledgement information to a relay device that is located on the selected path and different from a relay device located on the one of the paths over which the packet receiver has received the packet.

4. The receiving device according to claim 1, wherein a relay device that is located on the one of the paths over which the packet receiver has received the packet does not overlap the relay device that is located on the selected path.

5. The receiving device according to claim 1, wherein the reception-acknowledgement information includes information that indicates that at least one packet has been received immediately before reception of a packet corresponding to the maximum value of the sequence numbers.

6. A relay device comprising:
a packet receiver that receives packets;
a packet transmitter that transmits the packets received by the packet receiver to a reception device through a communication path;
a reception-acknowledgement information receiver that receives reception-acknowledgement information sent from the reception device that indicates that a packet has been received by the reception device from another relay device through another communication path; and
a packet discard controller that discards the packet indicated by the reception-acknowledgement information that has not been transmitted by the packet transmitter, wherein
the reception-acknowledgement information includes a maximum value of sequence numbers that are included in packets received by the reception device, and
the reception-acknowledgement information signals the relay device to immediately discard upon receiving one or more redundant packets having sequence numbers equal to or less than the maximum value of sequence numbers.

7. The relay device according to claim 6, wherein the packet discard controller discards, based on the reception-acknowledgement information, a packet that is being transmitted by the packet transmitter.

8. The relay device according to claim 6, further comprising a reception-acknowledgement information transferrer that transfers, to a path over which the packet receiver has received a packet, reception-acknowledgement information corresponding to a packet that has not been received by the packet receiver.

9. A reception method comprising:
receiving a packet from at least one of a plurality of paths through each of which a redundant set of one or more packets is transmitted;
generating reception-acknowledgement information indicating that the packet has been received,
selecting, from among the plurality of paths, a path that is different from the at least one of the plurality of paths, and
transmitting the reception-acknowledgement information to the selected path, wherein
the reception-acknowledgement information includes a maximum value of sequence numbers that are included in packets received by the packet receiver, and
the reception-acknowledgement information signals a relay device on the selected path to immediately discard upon receiving one or more redundant packets having sequence numbers equal to or less than the maximum value of sequence numbers.

10. A relay method that is performed by a relay device, comprising:
receiving packets;
transmitting the received packets to a reception device through a communication path; and
receiving reception-acknowledgement information sent from the reception device that indicates that a packet has been received by the reception device from another relay device through another communication path; and
discarding the packet indicated by the reception acknowledgement information that is among the received packets and that has not been transmitted, wherein
the reception-acknowledgement information includes a maximum value of sequence numbers that are included in packets received by the reception device, and
the reception-acknowledgement information signals the relay device to immediately discard upon receiving one or more redundant packets having sequence numbers equal to or less than the maximum value of sequence numbers.

11. A communication system comprising:
a transmitting device;
a receiving device that is coupled to the transmitting device over a plurality of paths; and
a relay device that is located on each of the plurality of paths, wherein the receiving device includes:
a packet receiver that receives a redundant set of one or more packets that are transmitted from the transmitting device over each of the plurality of paths; and
a packet transmitter that generates reception-acknowledgement information when the packet receiver receives a packet over one of the plurality of paths, selects a path that is different from the one of the paths among the plurality of paths, and transmits the reception acknowledgement information to the selected path, the reception acknowledgement information indicating that the packet receiver has received the packet, and
wherein the relay devices each includes:
a packet receiver that receives packets;
a packet transmitter that transmits the packets received by the packet receiver of the relay device;
a reception-acknowledgement information receiver that receives the reception-acknowledgement information; and
a packet discard controller that discards, based on the reception-acknowledgement information, a packet that has not been transmitted by the packet transmitter of the relay device, wherein
the reception-acknowledgement information includes a maximum value of sequence numbers that are included in packets received by the reception device, and
the reception-acknowledgement information signals the relay device to immediately discard upon receiving one or more redundant packets having sequence numbers equal to or less than the maximum value of sequence numbers.

* * * * *